US009137723B2

(12) United States Patent
Maguire et al.

(10) Patent No.: US 9,137,723 B2
(45) Date of Patent: Sep. 15, 2015

(54) PORTABLE PLATFORM FOR NETWORKED COMPUTING

(71) Applicant: Facebook, Inc., Menlo Park, CA (US)

(72) Inventors: Yael G. Maguire, Boston, MA (US); Giovanni Coglitore, Saratoga, CA (US); Caitlin E. Kalinowski, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 92 days.

(21) Appl. No.: 13/914,570

(22) Filed: Jun. 10, 2013

(65) Prior Publication Data

US 2014/0282967 A1 Sep. 18, 2014

Related U.S. Application Data

(60) Provisional application No. 61/801,526, filed on Mar. 15, 2013.

(51) Int. Cl.
| | |
|---|---|
| *H04L 29/06* | (2006.01) |
| *H04W 36/18* | (2009.01) |
| *H04W 4/00* | (2009.01) |
| *H04W 4/20* | (2009.01) |
| *H04W 36/14* | (2009.01) |

(Continued)

(52) U.S. Cl.
CPC ............. *H04W 36/18* (2013.01); *H04L 65/403* (2013.01); *H04W 4/008* (2013.01); *H04W 4/206* (2013.01); *H04W 36/14* (2013.01); *H04W 8/005* (2013.01); *H04W 88/04* (2013.01); *H04W 88/10* (2013.01)

(58) Field of Classification Search
CPC ..... H04L 65/403; H04W 36/18; H04W 4/008
USPC ............................................................. 726/7
See application file for complete search history.

(56) References Cited

U.S. PATENT DOCUMENTS

| 5,887,063 A * | 3/1999 | Varadharajan et al. ........ 713/172 |
| 7,069,308 B2 * | 6/2006 | Abrams ........................ 709/218 |

(Continued)

FOREIGN PATENT DOCUMENTS

| KR | 10-2004-0094563 A | 11/2004 |
| WO | 2012/109696 A1 | 8/2012 |
| WO | WO 2012-150907 A1 | 11/2012 |

OTHER PUBLICATIONS

U.S. Appl. No. 13/914,563, filed Jun. 10, 2013, Yael G. Maguire.

(Continued)

*Primary Examiner* — Saleh Najjar
*Assistant Examiner* — Oleg Korsak
(74) *Attorney, Agent, or Firm* — Baker Botts L.L.P.

(57) ABSTRACT

In one embodiment, a portable, networked, computing device comprises a processor, a plurality of radios, and a memory. The device may be operable to pair, by at least one of the radios, with a device associated with a user. The device may then monitor, by one of the radios, a signal for a connection established with a first network. When the device determines that the signal for the first network has dropped below a threshold level of quality, it may enable access point mode for at least one of the paired devices by turning on a radio to establish a connection with a second network and thereby providing connectivity to the second network for the at least one of the paired devices. If multiple networks are available, the device may select an optimal network based on an assessment of one or more factors.

24 Claims, 10 Drawing Sheets

(51) Int. Cl.
*H04W 8/00* (2009.01)
*H04W 88/04* (2009.01)
*H04W 88/10* (2009.01)

(56) References Cited

U.S. PATENT DOCUMENTS

| | | | |
|---|---|---|---|
| 7,698,556 B2* | 4/2010 | Zhang et al. | 713/171 |
| 7,907,564 B2 | 3/2011 | Laux | |
| 8,010,131 B2* | 8/2011 | Rothschild | 455/456.3 |
| 8,224,246 B2* | 7/2012 | Suumaki et al. | 455/41.1 |
| 8,250,632 B1* | 8/2012 | Staddon | 726/4 |
| 8,402,094 B2 | 3/2013 | Bosworth | |
| 8,676,844 B2* | 3/2014 | Sityon et al. | 707/783 |
| 8,897,152 B1 | 11/2014 | Caceres | |
| 2002/0012381 A1 | 1/2002 | Mattisson | |
| 2004/0253923 A1 | 12/2004 | Braley | |
| 2008/0137572 A1 | 6/2008 | Park | |
| 2008/0227488 A1 | 9/2008 | Zhu | |
| 2010/0180032 A1* | 7/2010 | Lunt | 709/225 |
| 2011/0003590 A1 | 1/2011 | Yoon | |
| 2011/0106279 A1 | 5/2011 | Cho | |
| 2011/0194532 A1 | 8/2011 | Kakkad | |
| 2011/0275316 A1* | 11/2011 | Suumaki et al. | 455/41.1 |
| 2012/0166433 A1 | 6/2012 | Tseng | |
| 2012/0166532 A1 | 6/2012 | Juan | |
| 2012/0182938 A1 | 7/2012 | Mujtaba | |
| 2012/0276891 A1 | 11/2012 | Bai | |
| 2012/0307875 A1 | 12/2012 | Maguire | |
| 2012/0309453 A1 | 12/2012 | Maguire | |
| 2012/0322502 A1 | 12/2012 | Song | |
| 2013/0022022 A1 | 1/2013 | Schmitt | |
| 2013/0052946 A1 | 2/2013 | Chatterjee | |
| 2014/0095606 A1 | 4/2014 | Matus | |
| 2014/0185469 A1 | 7/2014 | Marmolejo-Meillon | |
| 2014/0192643 A1 | 7/2014 | Kalapatapu | |

OTHER PUBLICATIONS

U.S. Appl. No. 13/914,576, filed Jun. 10, 2013, Yael G. Maguire.
U.S. Appl. No. 13/843,155, filed Mar. 15, 2013, Yael Maguire.
International Search Report and Written Opinion for International Application PCT/US2014/024843, Sep. 9, 2014.
International Search Report and Written Opinion from International Application No. PCT/US2014/024793, 10 pgs., Jul. 29, 2014.
International Search Report and Written Opinion from International Application No. PCT/US2014/024822, 9 pgs., Jul. 21, 2014.
Non-Final Office Action for U.S. Appl. No. 13/914,563, Jan. 2, 2015.

* cited by examiner

PORTABLE PLATFORM FOR NETWORKED COMPUTING

PRIORITY

This application claims the benefit, under 35 U.S.C. §119 (e), of U.S. Provisional Patent Application No. 61/801,526, filed 15 Mar. 2013, which is incorporated herein by reference.

TECHNICAL FIELD

This disclosure generally relates to networked computing devices.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device such as a smartphone, tablet computer, or laptop computer—may include functionality for determining its location, direction, or orientation, such as a GPS receiver, compass, altimeter, accelerometer, or gyroscope. Such a device may also include functionality for wireless communication over any conventional technology, such as, by way of example and not limitation, BLUETOOTH, near-field communication (NFC), radio frequency (e.g., RFID), infrared (IR), Wi-Fi, pager, or cellular (e.g., 2G, 3G, 4G). Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a portable, networked computing device ("PND") provides seamless and portable network connectivity for a user's devices in a device cloud. In particular embodiments, the PND may be a stand-alone small (e.g., key-fob-sized) device; in other embodiments, the PND may be integrated into one of the user's devices (e.g., a smartphone or tablet computing device). The PND may be designed to take advantage of any available network connection in order to act as a network access point for devices that may not include all of the same capabilities. A PND may be paired with one or more devices, with which it may communicate directly, in a peer-to-peer fashion, by low-power radio when it is within a threshold proximity with the PND-paired device(s). The PND itself may monitor network availability and/or link quality and turn on one or more of its own additional radios on an as-needed basis (conserves power and may reduce cost). For example, when the PND detects that WiFi signals are becoming weak, it may activate its cellular radio to seamlessly provide network connectivity to paired devices within proximity of the PND.

A brand-new device being introduced into the user's device cloud may take advantage of proximity to devices already registered as being associated with the user to jump-start customization of the user's experience with the device using social-networking information. In addition, when a guest enters a PND user's home, the guest's PND will attempt to establish a peer-to-peer connection with one of the user's devices in the device cloud. The guest may be authenticated in accordance with social graph information and other social-networking information (e.g., first-degree friends may automatically be authenticated to access and use the user's devices). Such access may be granted/restricted according to any property or attribute associated with an element of the user's social graph (e.g., only allowing access to other social-network users in a designated "Close Friends" group to be automatically authenticated upon entering the user's home).

Mobile/portable PND-paired devices in the user's device cloud may include a 2G radio or a two-way pager radio so that the device can send out an alert and communicate its location if it determines that it is lost, based on an inability to detect the PND within range.

A user may be able to use one of the devices in the device cloud to control one or more mobile/portable PND-paired devices comprising the user's device cloud (e.g., PND, phone, tablet, laptop, automobile, watch, camera). In a group situation, such as where each member of a household has their own individual PND that is carried on their person, each PND may be configured for individual authentication and levels of authorization to access and/or control devices in the household device cloud. Roaming users to whom members of the household may be connected by way of a social graph may be granted permissions in accordance with social graph information and other social-networking information.

A user interface may be provided on the control device to control other devices in the device cloud. Such a control interface may be displayed in a convenient manner so as not to impair the user experience. For example, if the control device is a smartphone, the interface to control other devices may be provided in such a way so as not to require the user to unlock their smartphone in order to use the interface. Icons to control one or more devices may appear on the locked-screen interface, based on proximity of the smartphone to the one or more devices.

DESCRIPTION OF EXAMPLE EMBODIMENTS

A portable, networked, computing device ("PND") that can act as a universal control and network access point for one or more devices with which the PND is paired. In particular embodiments, a PND may comprise a portable device (e.g., key-fob-sized device) including network components to enable the PND to pair with and communicate with PND-paired devices. In particular embodiments, a PND pairs with devices using a radio (e.g., a low-power radio using the Bluetooth low energy (BLE) standard or a conventional radio using the soft access point functionality of the WI-FI DIRECT standard) that requires that any such paired devices be within a threshold proximity to the PND.

Figure 1:
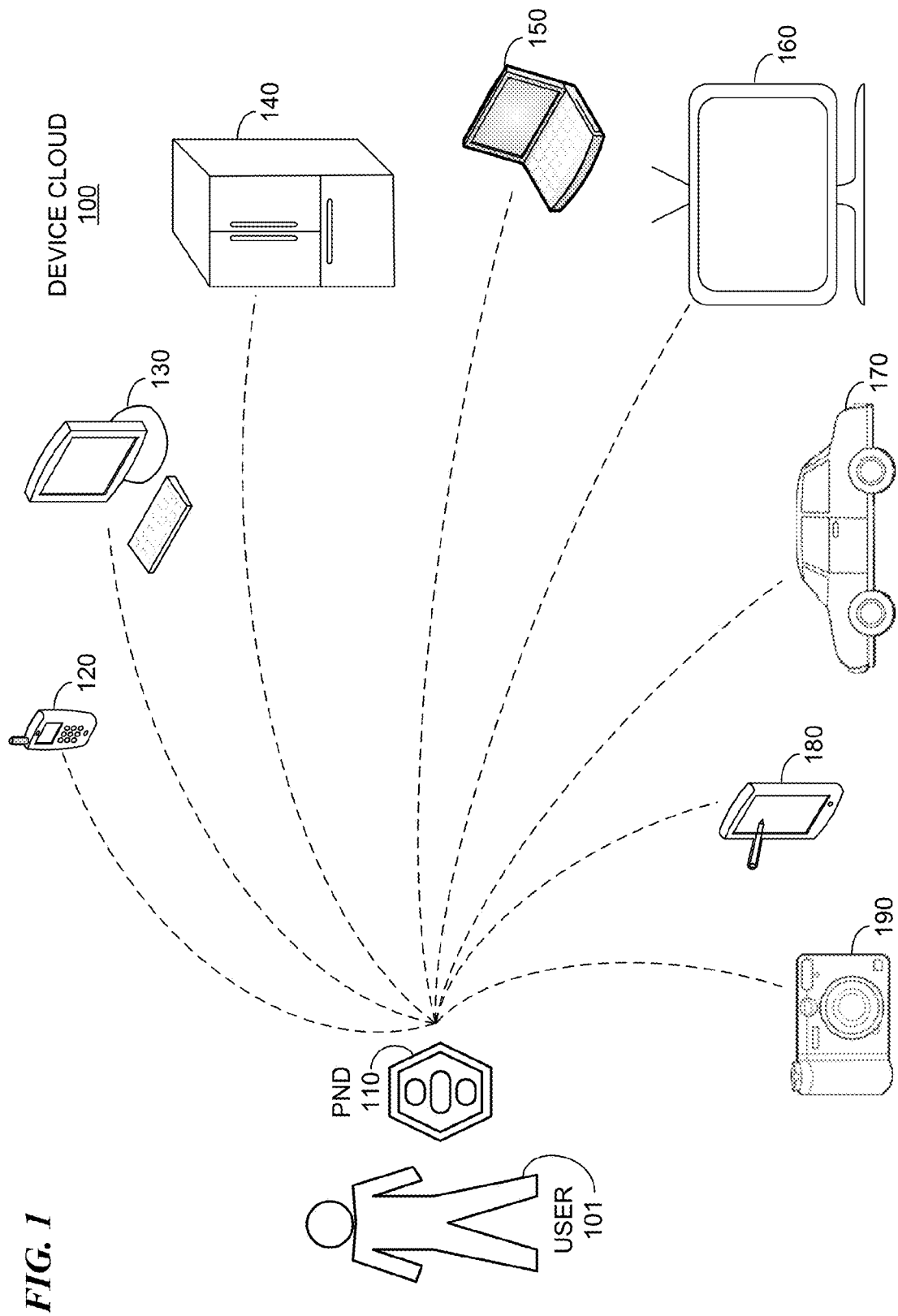
FIG. 1 illustrates an example device cloud associated with a user.

FIG. 1 illustrates an example device cloud 100 including devices associated with a user 101. A user's PND 110 may be paired with one or more devices in device cloud 100; PND 110 may communicate directly with one of more of the PND-paired devices in device cloud 100, in a peer-to-peer fashion, by low-power radio when it is within a threshold proximity to the device. In particular embodiments, a PND-paired device may comprise any device that includes at least one processor and at least one mode of network connectivity (e.g., phone 120, desktop computer 130, refrigerator 140, security system 150, television (TV) 160, automobile 170, tablet 180, and camera 190). By pairing a device with PND 110, the user may be able to activate, control, and otherwise use devices in the device cloud. For each PND-paired device, PND 110 may store a unique device identifier (e.g., UDID), authentication information, or a user identifier (e.g., an identifier for the owner/operator/authorized user of the device).

PND 110 may be designed to take advantage of any available network connection, while acting as a network access point for devices that may not include all of the same capabilities. A PND-paired device may thereby be able to conserve power without sacrificing network connectivity by including only low-power radios, which may also improve the device's form factor, both by eliminating cellular radio(s) and antenna(e), as well as reducing the size of the battery (allowing for a slimmer, lighter device).

PND 110 may include antennae and one or more low-power and high-power radios for various types of network connections, e.g., cellular (e.g., 2G/3G/4G/4G LTE), Wi-Fi (e.g., 802.11n, 802.11ac, 802.11ad WiGig), Wi-Fi-based higher-level protocols (e.g., INTEL WIRELESS DISPLAY (WiDi), Wi-Fi mesh (e.g., ITU-T G.hn)), TV whitespace/mesh (TVWS, or 802.11af), GPS, Bluetooth, Bluetooth Low Energy, near-field communication (NFC), satellite, pager radio, etc.

In particular embodiments, PND 110 may also include external physical features, such as, for example and not by way of limitation, a button interface, a status indicator, a small/low-power screen, a memory card slot, and connection ports (e.g., USB, Ethernet, optical). In particular embodiments, a PND may be able to connect to a power adapter, draw power from a received RF signal, generate power using integrated piezoelectric components, or otherwise utilize power using any conventional source.

Each PND-paired device may be able to use PND 110 for network connectivity, either on a constant basis (e.g., whenever the user holding PND 110 is within proximity to the PND-paired device), or on an as-needed basis (e.g., whenever the PND-paired device's network connectivity becomes sporadic/weak/unavailable or costly, based on financial cost to the user or energy/resource consumption by the PND-paired device).

For example, PND 110 may comprise a small device attached to a user's keychain that has cellular and Wi-Fi connectivity and is paired with tablet 180 and telephone 120 via Wi-Fi, Bluetooth, or NFC. Since PND 110 is seamlessly connected to the Internet at all times, if user 101 carries tablet 180 and telephone 120 around in a bag, PND 110 may provide user 101 with a seamless connection to the Internet regardless of where user 101 might go (taking PND 110 and the user's PND-paired devices), so as to provide IP-based telephony and messaging capabilities to telephone 120 and Internet connectivity to tablet 180. PND 110 may also be paired with and provide network connectivity for other devices, so that the user is able to use network-enabled features on any such devices as long as PND 110 is within the threshold proximity to the device.

Since PND 110 can act as an access point (and thereby establish a local private network for devices paired with PND 110), multiple devices connected to one PND 110 may also be able to communicate with each other via PND 110, even when PND 110 is not connected to an external network.

In particular embodiments, one of more of the PND-paired devices may operate as "dumb terminal" devices that become personalized computing devices upon pairing with a user's PND. A "dumb terminal" device may include any computing device that does not persistently store user-specific information and can be temporarily converted into a personalized computing device for a user (e.g., public or shared-use). PND 110 may be able to pair with and utilize a dumb terminal device for any and all suitable purposes. In some embodiments, PND 110 may wirelessly pair with a device; in some embodiments, PND 110 may be able to physically plug into the device.

For example, a library may provide number of standard-issue desktop computers 130 (i.e., dumb terminal devices), wherein a member of the library can pair a desktop computer 130 with their PND 110, and the PND 110 will configure desktop computer 130 to adopt the user's preferences (e.g., desktop theme, language settings, and time zone), comply with the user's security policies (e.g., authentication, authorization, and screen-lock timeout policies), and access and load the user's content (e.g., social-networking information, music library, photo album, subscribed periodicals).

In another example, user 101 may be able to get into car 170 (an autonomous, robot-driven "taxicab") which, upon pairing with PND 110, authenticates user 101, provides personalized destination suggestions for user 101 (e.g., the user's home, workplace, school, or a destination specified in the user's calendar), authorizes payment for user 101 (based on the user's selected destination), and transports user 101 to their selected destination in accordance with their personal preferences (e.g., as fast as possible, or controlled and leisurely), while providing videoconferencing facilities for user 101 during the ride.

PND 110 may also store user-specific authentication and authorization credentials, payment credentials (e.g., smart card chip), telephony identifiers (e.g., SIM card), configuration settings, preferences, favorites lists/bookmarks, applications, or any other data to enable PND 110 to facilitate personalized and secure computing in conjunction with the PND-paired devices. In particular embodiments, certain PND-paired devices (e.g., home security system, a safe, a gun locker, a bicycle chain, a laptop security cable) may comprise additional components for security purposes (e.g., sensors and logic to perform biometric identification).

In particular embodiments, PND 110 may be able to disavow a pairing with a dumb terminal device without leaving any trace of personal information, usage logs, or other user-identifying information on the dumb terminal device.

A PND 110 itself may monitor network availability and/or link quality and turn on one or more of its radios on an as-needed basis, in order to conserve power and reduce cost (e.g., turning on a high-power radio, such as a cellular radio, or turning on a radio that provides a connection to a network requiring payment to use bandwidth). When the link quality (e.g., as characterized by received signal strength indication (RSSI)) detected by PND 110 drops below a particular threshold (i.e., begins to decrease to the point where it appears the user is going to leave the zone of the Wi-Fi network), PND 110 turns on the cellular radio and goes into access point mode on its Wi-Fi to seamlessly provide network connectivity to paired devices within threshold proximity of PND 110. The threshold may be characterized according to any of a number of different attributes of the signal, including, but not limited to: signal strength, signal-to-noise ratio, average data throughput, average data latency, or any other attribute of the signal, or any combination of attributes. The threshold may also be characterized by one or more data-quality metrics as well, such as the current and/or historical throughput to a known site (e.g., a social-networking website) with respect to either latency and/or throughput (for example, if the latency exceeds the threshold or the throughput drops below the threshold, then PND 110 may go into access point mode). In particular embodiments, either PND 110 and/or the PND-paired device may be able to detect network availability and/or link quality. In particular embodiments, PND 110 may obtain such information from the PND-paired device, and vice versa.

In particular embodiments, PND 110 may calculate the threshold and/or make this determination to go into access point mode based off of other factors or conditions besides simply detecting a real-time drop in RSSI, such as, for example, historical data logging RSSI data at particular locations (e.g., the PND 110 is being carried by the user and headed in the direction of a "dead spot" where RSSI has historically dropped below some threshold), designations of low-RSSI locations (e.g., inside of a secure military complex that blocks all wireless signals except those on a particular bandwidth), or designations of estimated RSSI at particular locations (e.g., network coverage maps calculated based on signal type and base station location information). In particular embodiments, such factors may be determined based on information shared across a network of users, such as, for example, a network of registered PND users, a network of users associated with an organization (e.g., a company's employees or a group of customers paying for network service), or a social network of users connected within a social graph.

When a PND-paired device loses network connectivity (e.g., moves out of range of a home Wi-Fi network), the device may automatically begin utilizing PND 110 for network connectivity. PND 110 itself may continually monitor the level of connectivity with familiar networks and only serve as an access point when it detects that any signals from familiar networks is becoming attenuated.

In particular embodiments, PND 110 may be able to perform seamless handoffs between different types of networks so as to avoid any interruption in connectivity. Once a PND-paired device comes into range of a familiar network, it may be able to seamlessly switch back from using PND 110 for network connectivity to using the familiar network (e.g., when the user comes home and is within range of a home Wi-Fi network, the user's tablet 180 may switch over to connect to the home Wi-Fi network).

Figure 2:
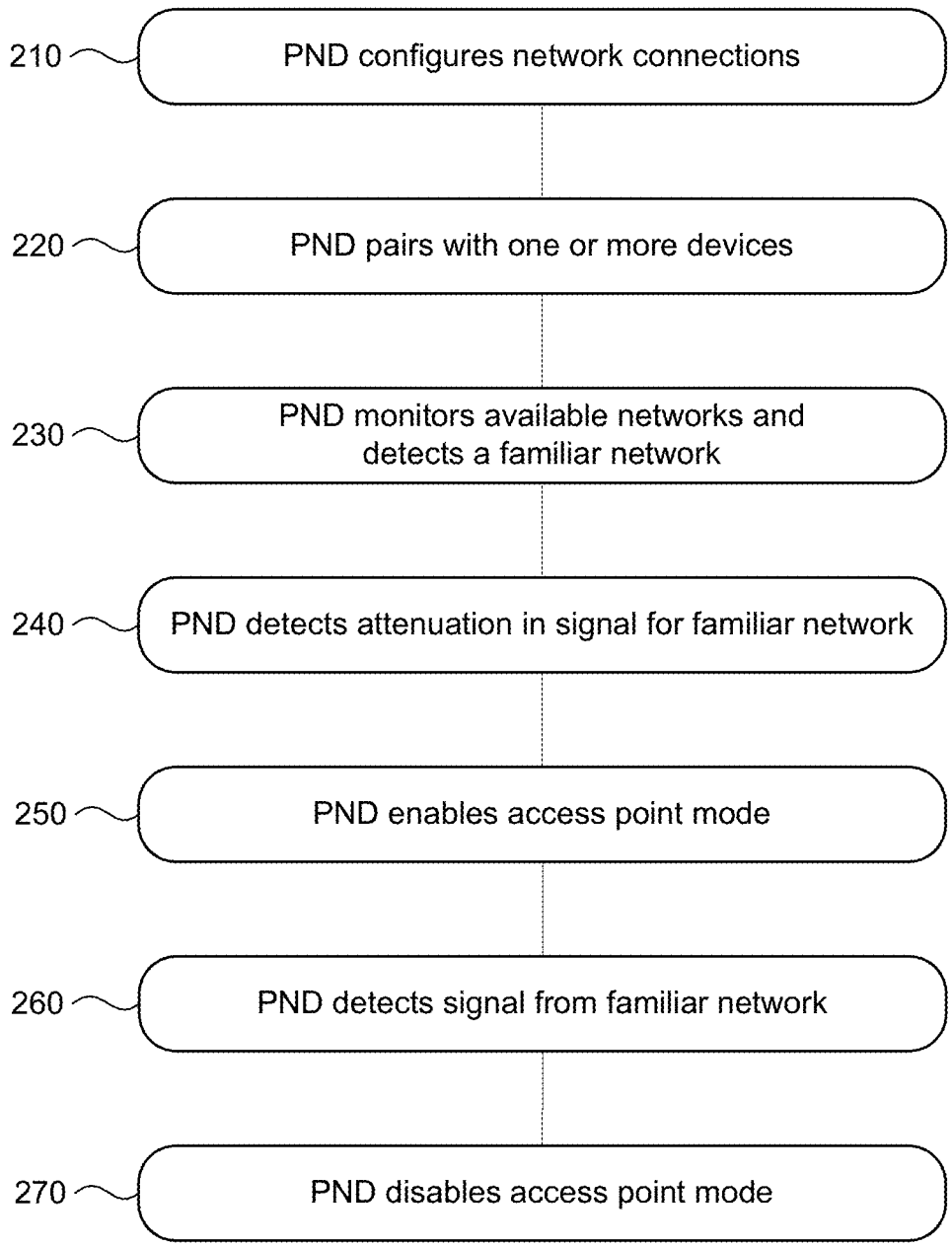
FIG. 2 illustrates an example method for providing seamless and portable network connectivity for a user's devices.

FIG. 2 illustrates an example method 200 for providing seamless and portable network connectivity for a user's devices. The method may begin at step 210, where a PND configures familiar network connections. This initial step may be performed at the time when the user is first associated with the PND, as well as whenever the user connects with a new network and establishes the network as a new familiar network. As described above, the PND may obtain network connectivity information from the user's other devices, or the PND may obtain such information by accessing a profile for the user locally or through the social network.

At step 220, the PND may pair with one or more devices. For example, while the user is at home and within threshold proximity to any or all of phone 120, desktop computer 130, refrigerator 140, security system 150, television (TV) 160, tablet 180, and camera 190, the PND may remain paired to any such devices. In particular embodiments, the PND may pair with a device in order to retrieve network connectivity information prior to configuring any network connections. In particular embodiments, PND 110 may require that initial pairing with a device take place using a radio that requires very close proximity, such as NFC, or by a Wi-Fi or Bluetooth radio where distance is determined by a maximum RSSI threshold, in order to provide extra security and help avoid inadvertently pairing PND 110 with a device.

At step 230, the PND may monitor available networks and detect a familiar network (e.g., a home Wi-Fi network). As long as the detected signal for the network is of sufficient quality, the PND may itself utilize the familiar network for network connectivity and expect that any PND-paired devices will do the same. In particular embodiments, the PND may automatically determine that a detected network is a "familiar" network because it is provided by another user that is known to user 101 (e.g., a social-networking connection of user 101). The PND may identify the provider of a network by detecting the other user's PND and identifying and/or authenticating that PND. In particular embodiments, the PND belonging to user 101 may utilize particular security measures based on attributes of the detected network (e.g., whether it is an open or secured network, or whether the other user is a trusted friend of user 101 or simply a friend of a friend). In particular embodiments, the PND belonging to user 101 may limit or throttle back certain types of network communications by paired devices based on attributes of the detected network (e.g., if the detected network require payment based on bandwidth usage or quantity of data downloaded, or if the detected network imposes bandwidth limits).

In particular embodiments, a PND 110 may be able to access a mesh network grid formed when a sufficient density of users within a geographic region provide wireless network access to which PND 110 can connect. A PND-carrying user may be able to travel significant distances (e.g., across a city) without activating any cellular radios (or other high-power radios), simply by switching from wireless network to wireless network. For example, in a particular region, many if not all residents may have set up individual Wi-Fi and/or television whitespace (TVWS) networks, wherein a user's PND 110 is configured to access some or all such networks, in addition to more far-ranging networks (e.g., commercial cellular networks), to provide seamless connectivity for devices that paired with the user's PND 110.

Such embodiments may facilitate security and/or bandwidth consumption control for a unit of a mesh network (e.g., an individual home Wi-Fi network) by establishing rules that place restrictions upon roaming users who wish to connect to their wireless network, such as, by way of example and not limitation: (1) restricting access to other social-network users (e.g., by confirming that they have a valid user identifier), (2) restricting access to other social-network users within their social graph, (3) restricting access to other social-network users within a threshold degree of separation, (4) restricting access according to any other property or attribute associated with an element of the user's social graph (e.g., only allowing access to other social-network users in a designated group), (5) restricting access to particular days or times, (6) only allowing access to particular users (e.g., other social-network users who are not within the user's social graph) by charging a connection fee, (7) restricting access to a maximum number of roaming users, (8) restricting access to a maximum bandwidth per device, (9) restricting access to particular application types, (10) restricting access by a connection timeout, (11) restricting access to only allow connections by roaming users who also contribute to the access grid by providing their own wireless networks, or any combination of such rules.

At step 240, the PND may detect that the signal for the familiar network is dropping or has dropped below a threshold level of quality (e.g., the signal drops, becomes unstable, or attenuated) and enable its access point mode (in step 250), thereby providing network connectivity for any paired devices. The threshold level of quality of a network signal may be determined as discussed above, based off of various factors and/or conditions. For example, if user 101 has walked out of their home holding telephone 120, tablet 180, and camera 190, gotten into automobile 170, and begun driving off, the PND may detect that it is no longer within range of the home Wi-Fi network and is now only within range of a home TVWS network. At this point, the PND may enable its access point mode in order to provide seamless connectivity for telephone 120, tablet 180, camera 190, and automobile 170. In particular embodiments, the PND may enable its access point mode simply based on the fact that user 101 entered and turned on automobile 170, since at that point, it is very likely that user 101 will imminently move out of range of the home Wi-Fi network. In particular embodiments, the PND may only enable access point mode if the PND detects PND-paired devices within threshold proximity to the PND (thereby conserving power if there are no devices that may need to use the PND for network connectivity).

The PND may also commence performing operations in order to smoothly establish a network connection for any such devices so that they can continue communication via the PND instead of the familiar network, such as, for example, initiating/facilitating a soft handoff by temporarily utilizing both the familiar network and the PND access point in parallel. The PND may use multi-frequency radios (2.4 GHz and 5 GHz) to ensure that it can maintain access point mode and test the quality of the familiar network. PND could also use GPS or indoor beacons to determine the imminent dropout of the original Wi-Fi. PND and the user devices could also communicate in a peer-to-peer fashion to mutually evaluate network changes.

In particular embodiments, rather than switching between networks, the PND may combine available bandwidth across multiple networks (e.g., in order to meet a specified Quality of Service standard or requirement for transmission of particular types of content, such as high-definition video).

At step 260, the PND may detect that the signal for the familiar network is of sufficient quality again (or that another familiar network is now within range) and disable its access point mode (in step 270). In particular embodiments, if the PND detects that there are any paired devices that are communicating via the PND, the PND may perform operations in order to smoothly hand off the network connection for any such devices so that they are instead connected to the familiar network. For example, if user 101 has arrived at work and PND 110 detects the user's work Wi-Fi network, or if user 101 has arrived at an often-frequented café with a TVWS network, the PND may connect to the newly-detected network, initiate/facilitate a soft handoff for any devices that are currently utilizing the PND for network connectivity (e.g., telephone 120 and tablet 180), and then disable its access mode. In particular embodiments, PND 110 may detect that a paired device is utilizing the PND 110 for a high-demand activity (e.g., making a telephone call, or streaming high-bandwidth content) and postpone disabling access point mode until the activity has ended.

If more than one network is available, the selection of which particular network to join may included an assessment of which network is optimal, wherein the analysis may be based on any number of cost factors, including but not limited to, technical factors, economic factors, security factors, and user preference factors, such as, for example: available bandwidth, network type (e.g., 4G cellular vs. TVWS vs. 802.11n), signal strength, noise, level of interference, resource consumption required to establish and maintain a connection with the network (e.g., utilizing a radio to connect to a cellular network may require more power than a radio to connect to a Wi-Fi network), whether a particular network is familiar to PND 110 (e.g., PND 110 previously successfully connected to the network or has a stored password to access the network), whether there is any cost incurred by connecting to the network (e.g., is there free access? is the access free, but the network require that you use software that displays ads? is this a sunk cost where the user is already paying for a regular subscription to the network? is the access pay-per-use?), whether the network is operated by a known person or entity (e.g., by your employer, by another user to whom you are connected in a social-networking system, by the host of an event for which the user has purchased admission), level of available security (e.g., open vs. WEP vs. WPA2), etc.

Once a PND-paired device (e.g., telephone 120) comes into range of a network associated with a particular phone number for the user (e.g., "home" network or "work" network), the PND-paired device may ring in response to callers calling the particular phone number. For example, when the user is at home (within range of their "home" network), the PND-paired device may detect an incoming call to the home phone number and cause the device to ring. PND 110 may also be able to provide an IP-based telephone feature that works transparently across international boundaries and across disparate networks (which may operate based on disparate technologies); in particular embodiments, a "phone number" may be associated with a user's social-networking user identity, and a first user of a social network may be able to call a second user of the social network simply by "dialing" the second user using their social-networking identifier (e.g., login username).

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3:
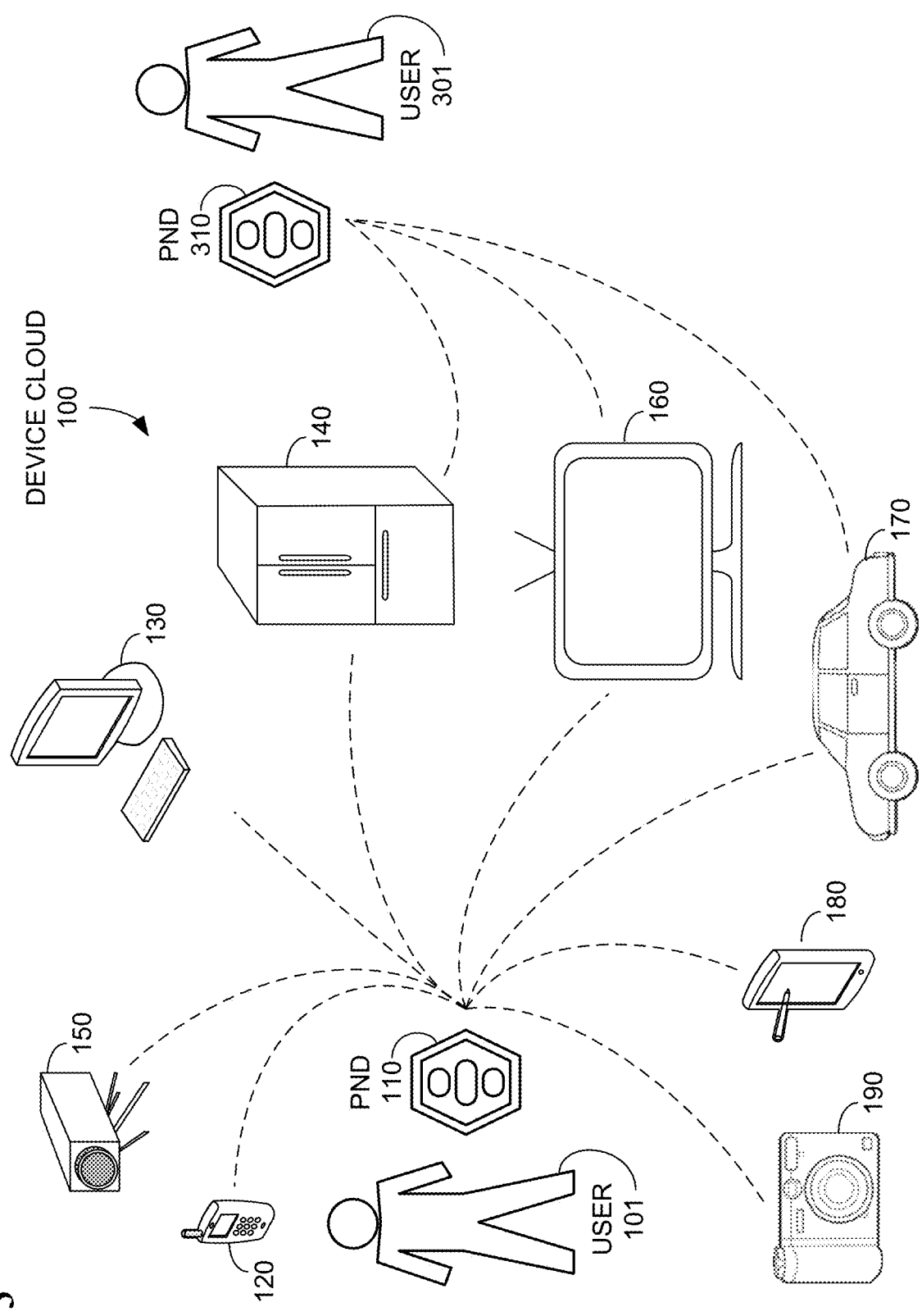
FIG. 3 illustrates the example device cloud of FIG. 1 and a PND-equipped guest user.

FIG. 3 illustrates user 101's example device cloud 100 of devices paired with PND 110 as shown in FIG. 1 (e.g., phone 120, desktop computer 130, refrigerator 140, security system 150, television (TV) 160, automobile 170, tablet 180, and camera 190), as well as guest user 301 who is equipped with her own PND 310 and wishes to temporarily or permanently pair with one or more devices in user 101's device cloud 100.

Typically, when a user sets up a new personalized device, such as an ANDROID or APPLE IOS device, the user is required to log in to the device with their existing user ID. The setup process may require that the user enter their password repeatedly, which may be cumbersome for the user. Oftentimes, it may be quite awhile before the device can present the user with a customized experience on the device, based on profile information associated with their existing user login. In addition, when using the device to make purchases, a user may again need to enter their password repeatedly.

Figure 4:
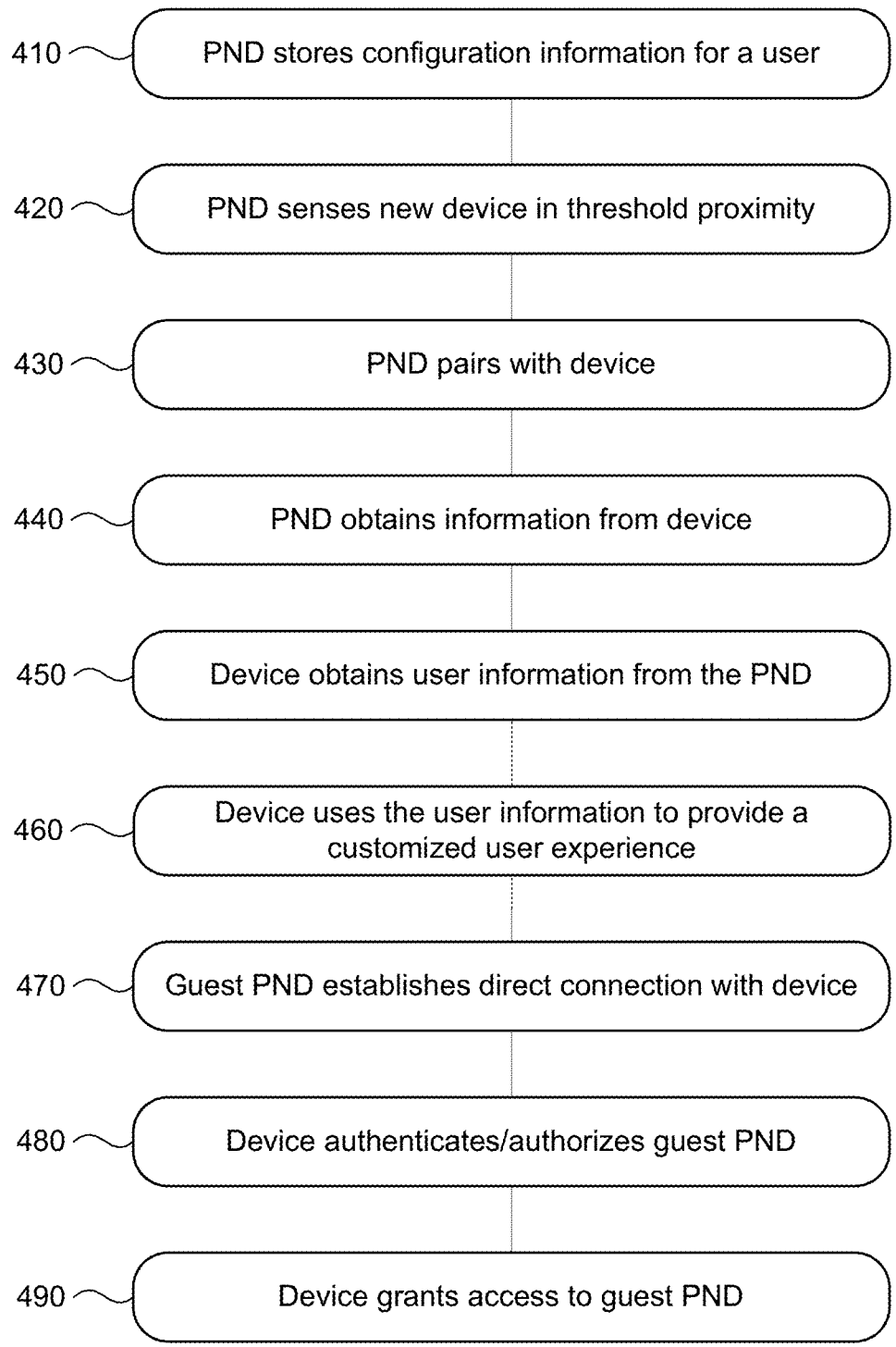
FIG. 4 illustrates an example method 400 for building a PND-based ecosystem of devices associated with users.

FIG. 4 illustrates an example method 400 for building a PND-based ecosystem of devices associated with users. The ecosystem may include the PND itself, as well as the device(s) in the device cloud. In step 410, new PND 110 stores configuration information associated with user 101. PND 110 may obtain the configuration information in any conventional manner: (1) by entering user-identifying and/or authentication information directly into PND 110 (e.g., by providing PND 110 with biometric identification, or by entering a user ID and password for a social-networking account of user 101), (2) by (at least temporarily) pairing PND 110 with a dumb terminal device that can be used to provide PND 110 with user credentials, (3) by encoding a PND 110 with user-identifying information at a store or fulfillment warehouse at the time of sale, (4) by encoding a brand-new PND 110 with user-identifying information upon connecting with the user's home Wi-Fi network (likely after receiving confirmation from the user), etc. In particular embodiments, PND 110 may be configured to access a user profile for user 101 (e.g., on a social-networking system based on the user's identifier on the social-networking system), from which PND 110 may retrieve network connectivity settings, or any other user-specific information.

In step 420, PND 110 (or a device that has already been paired with PND 110) senses a new (un-paired) device within a threshold proximity. In particular embodiments, the new device itself may sense that it is within threshold proximity of PND 110 or a PND-paired device. For example, if the user purchases a new tablet device online and has it shipped to their home, when the user brings the tablet into their home, the tablet may come within threshold proximity of the user's PND and/or one or more devices registered as being associated with the user. The new tablet may also sense that it is within range of the user's home Wi-Fi network, wherein the user's Wi-Fi router is paired with PND 110. The threshold proximity may be determined by the natural range of a particular radio that is to be used for pairing new devices. For example, in order to prevent inadvertent pairings (or attempts to pair a device), some embodiments may require that a near-field communication (NFC) radio be used for pairing new devices. In other embodiments (e.g., where pairing is performed using a network technology with a longer signal range, such as Wi-Fi Direct or BLE), the threshold proximity may be configured at a particular distance, e.g., one foot or less or one meter or less, or in accordance with an RSSI indicator (e.g., upper value for saturation).

In particular embodiments, a brand-new device being introduced into the user's device cloud may be able take advantage of proximity to a PND or other devices that have already been registered as being associated with the user in order to jump-start customization of the user's experience with the device by using social-networking information. In particular embodiments, a user's profile may be pre-configured to permit purchase/activation of a brand-new device when the user accesses a purchase/activation interface on the new device and the new device is within a threshold proximity of one or more other devices already registered as being associated with the user.

In step 430, in particular embodiments, the new device pairs with the user's PND and joins the user's device cloud. As part of the pairing process, PND 110 may attempt to establish a direct peer-to-peer-style connection with the device in order to exchange initial information. The user's PND may store the initial information associated with the new device (e.g., device ID, MAC address), and the new device may likewise store the initial information associated with the PND (e.g., PND ID). In particular embodiments, if the new device is within range of the user's home Wi-Fi network, the new device may be able to pair with the user's PND 110 even if it is not within threshold proximity of PND 110 (e.g., even if user 110 left PND 110 at their workplace, the new device may still be able to pair with PND 110 by connecting to PND 110 over the Internet via the home Wi-Fi network) in order to jump-start customization of the user's experience with the device).

In step 440, the new device may provide information to PND 110. For example, a device belonging to user 101 may have established its own network connectivity settings (e.g., Wi-Fi service set identifiers (SSIDs), encryption configuration settings and passwords) prior to pairing with PND 110, which it may then share with PND 110 upon pairing with PND 110.

In step 450, the new device may obtain user information from the PND or another PND-paired device. For example, based on the state of the tablet as a brand-new device and the proximity of the tablet with one or more other devices and/or the presence of the device within the user's home Wi-Fi network, the tablet may obtain identifying information for the user, such as the user's social-networking user identifier.

In step 460, the new device uses the user information to provide a customized user experience for user 101. For example, the tablet may use the user's social-networking user identifier to establish a connection to the social network, and begin downloading some information of various types in order to present an out-of-the-box social-network-based user experience (e.g., by displaying a cover photo on the locked screen, by being allowed to access the user's home Wi-Fi network, by setting basic device settings and/or metadata in accordance with the user's preferences, such as time zone, preferred language, etc.). In some embodiments, full access to the device and to the user's social-networking information (as presented on the device) may not be granted until the user enters their social-networking system credentials into the device. In particular embodiments, a brand-new device may be encoded with the user's social-networking user identifier on an integrated chip (e.g., an RFID/NFC tag) at a factory, warehouse, or some other point in a distribution chain so that the device can begin downloading some information of various types in order to present an out-of-the-box social-network-based user experience—his case, the user may not be required to enter their social-networking password as long as the new device is placed within a threshold proximity to another device already registered as being associated with the user.

Once user 101 has set up one or more PND-paired devices, the user may wish to securely provide a guest 301 with access to devices in the user's device cloud (e.g., refrigerator 140, TV 160, and automobile 170). Guest 301 may be authenticated in accordance with social graph information and other social-networking information (e.g., first-degree friends may automatically be authenticated to access and use the user's devices). Such access may be granted/restricted according to any property or attribute associated with an element of the user's social graph (e.g., only allowing access to other social-network users in a designated "Close Friends" group to be automatically authenticated upon entering the user's home).

In step 470, in particular embodiments, when guest 301 enters the user's home and comes within threshold proximity of a device, for example TV 160, guest 301's PND 310 will attempt to establish a direct peer-to-peer-style connection with TV 160. The requirement that a direct connection be established between PND 310 and the user's device implies that guest 301 is standing in the presence of the user, thus reducing the likelihood of gaining access through spoofing. In particular embodiments, for this type of authentication use case, PND 310 may be required to establish the direct connection using NFC or another type of wireless technology where the threshold proximity is very low (such that guest 301 is required to be very close to the device, as opposed to standing outside a window).

In step 480, once a direct connection has been established, the device may attempt to authenticate and/or authorize access for guest 301. For example, TV 160 may retrieve a social-networking user ID for guest 301 from PND 310, access a social-networking system, and determine whether guest 301 and the user are connected within a social graph of a social-networking system. If yes, TV 160 may recognize guest 301 as a friend of the user and display an interface for the user to grant credentials to guest 301. Such credentials may be assigned an expiration timestamp or be revoked. In particular embodiments, the device may grant access in accordance with an authorization level based on whether guest 301 is connected to user 101 within a threshold degree of separation, based on whether guest 301 belongs to a user-designated group of trusted friends (or a user-designated black list of untrusted friends), or based on some other information associated with guest 301.

In particular embodiments, use of a PND may support multi-factor authentication of a guest to whom a user may be connected by way of a social graph. The possession factor may be satisfied by guest 301 carrying the PND on their person. In an example relying on possession+inherence (of a kind), when guest 301 enters the user's house and attempts to pair their PND with the user's TV, PND 310 may transmit a token to the TV, which uses that token to search for guest 301 in the user's social graph and retrieve their user profile. The TV may then display guest 301's profile and ask the user to click a button on their own PND to confirm their guest's identity and permit guest 301 to pair their PND with the TV. In an example relying on possession+knowledge, after the TV locates guest 301 in the user's social graph, the TV may display a request for guest 301 to enter authentication credentials, such as a password or swipe gesture pattern (e.g., by using a remote control of the TV, by using PND 310, by using another device paired with PND 110, or by using a device paired with PND 310). In an example relying upon two degrees of possession, the user's own PND (or a PND belonging to someone else in the household) may also need to be present. In particular embodiments, authentication may be require that PND 310 be within threshold proximity of at least a minimum number of devices in user 101's device cloud (e.g., three PND-paired devices); if PND 310 can be determined to be within threshold proximity of at least those minimum number of user 101's devices, guest 301 may be authenticated (the assumption being that guest 301 could not be within threshold proximity of that many of user 101's devices without having been invited in). The more rigorous requirements of multi-factor authentication may also be applied selectively (e.g., for guests who are not first-degree friends of the user within the social graph).

In particular embodiments, a PND may be authenticated using a token-based peer-to-peer technique as described in U.S. patent application Ser. No. 13/843,155, filed 15 Mar. 2013 and titled "Wireless Data Privacy Maintained Through a Social Network." In particular embodiments, authentication may be performed In step 490, the device grants access and/or control to guest 301, based on the detected presence of their PND 310. In some embodiments, if PND 310 is not detected, the device may temporarily or permanently disable access/control (or only certain types of access/control, until PND 310 is detected and/or guest 301 re-authenticates their identity). In particular embodiments, this process may also include steps to authorize guest 301 to access different features of the device. For example, at the moment when a user confirms that guest 301 should be authenticated, the user may also manually configure access permissions for guest 301 with respect to the device. In another example, access permissions may be automatically configured in accordance with guest 301's social-networking profile and other social-networking information. For example, if guest 301 is a child, the TV's range of channels may automatically be limited to those deemed appropriate for children.

Although PND 110 has been described as being associated with a single user, in particular embodiments, PND 110 may be used by a group of users (e.g., a family or group of friends) to provide connectivity to devices associated with any user in the group and/or to allow any user in the group to connect to a dumb terminal device. In particular embodiments, such a PND 110 may be associated with a group profile, including any suitable type of information described herein (e.g., group-level authorization and security settings, payment credentials for a group bank account, shared group content). In particular embodiments, PND 110 may be used in association with a social-networking system to automatically detect and permit access to "friends" of a user of PND 110—such access may be restricted by degree of separation within the user's social graph.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

In some embodiments, when a PND-paired device determines that it has been lost because it is neither within range of the PND nor within range of a familiar network, the device may include a 2G radio or a two-way pager radio so that the device can send out an alert and communicate its location.

Such a device may utilize an IP address that can be geolocated or in the case of Wi-Fi, the SSID/password combination may be used to designate a trusted location (home, work, friend's house, etc.).

In particular, pager radios are often used in emergency situations for reasons that make them ideal for use when integrated into a device that has been lost: (1) pager networks are typically based on simulcast delivery by satellite-controlled networks with many overlapping pager transmitters, (2) pager radios can penetrate solid structures much more easily than other radios (e.g., cellular or Wi-Fi), and (3) pager radios draw very little power.

In some embodiments, no alert may be generated if a device happens to be within range of a trusted network (e.g., home Wi-Fi network) or is able to maintain a peer-to-peer connection with PND 110. In some embodiments, the 2G or pager radio remains powered off until the PND-paired device does not detect PND 110 and is not within range of a trusted network.

As discussed above, by pairing a device with PND 110, the user may be able to activate, control, and otherwise use devices in the device cloud. By connecting with the PND, one or more devices in the device cloud may be used to communicate with and control (actively or automatically) one or more other devices in the device cloud. A control interface may be provided on one device ("the control device") to control other devices in the device cloud. In particular embodiments, the control device may only provide controls for particular "controllable" devices in the device cloud, e.g., those that are sensed within a threshold proximity, those that include a remote interaction interface by which the device can receive and process commands for remote control, those for which the user of PND 110 has been granted authorization to control the device, or those that are available (e.g., powered on, connected to a network, operational, and/or enabled for remote control).

FIGS. 5A-D illustrate an example user interface (UI) 500 for controlling devices in a device cloud. In the example illustrated in FIGS. 5A-D, UI 500 is displayed on the screen of user 101's smartphone 120. In particular embodiments, UI 500 may be displayed on a home screen of smartphone 120, or even in a locked-screen interface (thereby being available for use without requiring user 101 to unlock smartphone 120).

Figure 5B:
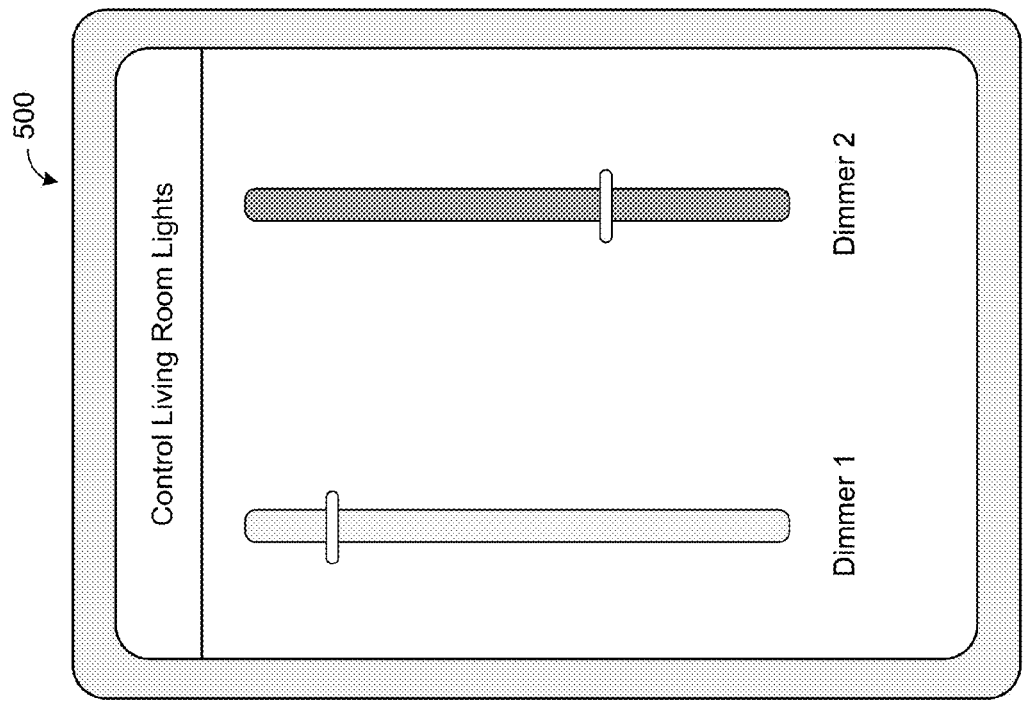
FIGS. 5A-D illustrate an example interface 500 for controlling devices in a device cloud.
Figure 5A:
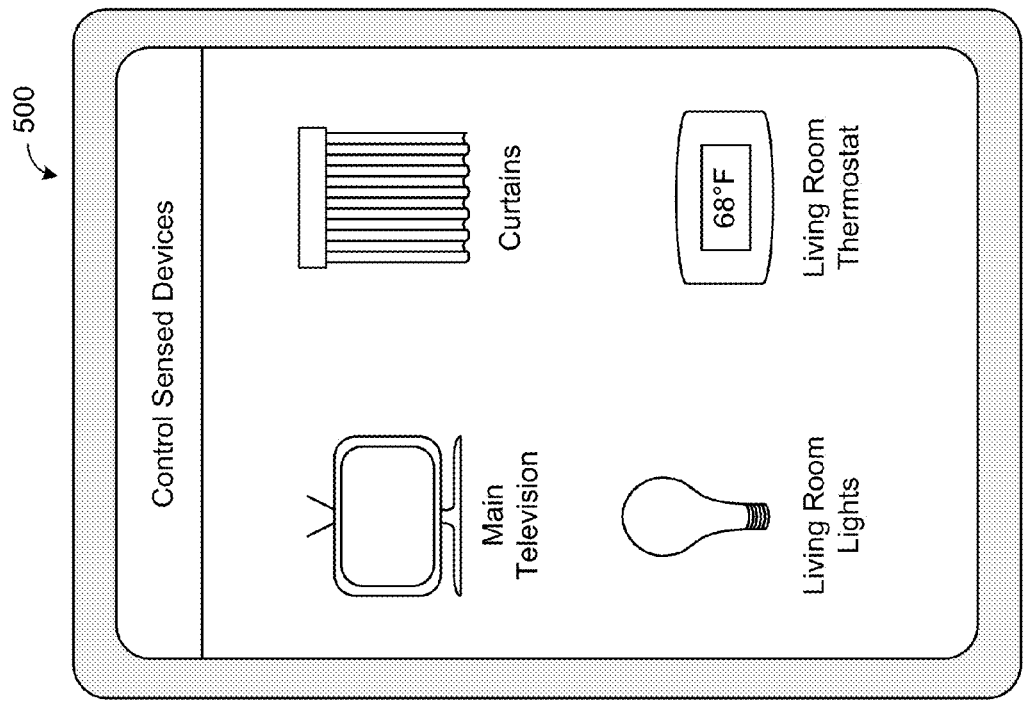
Figure 5D:
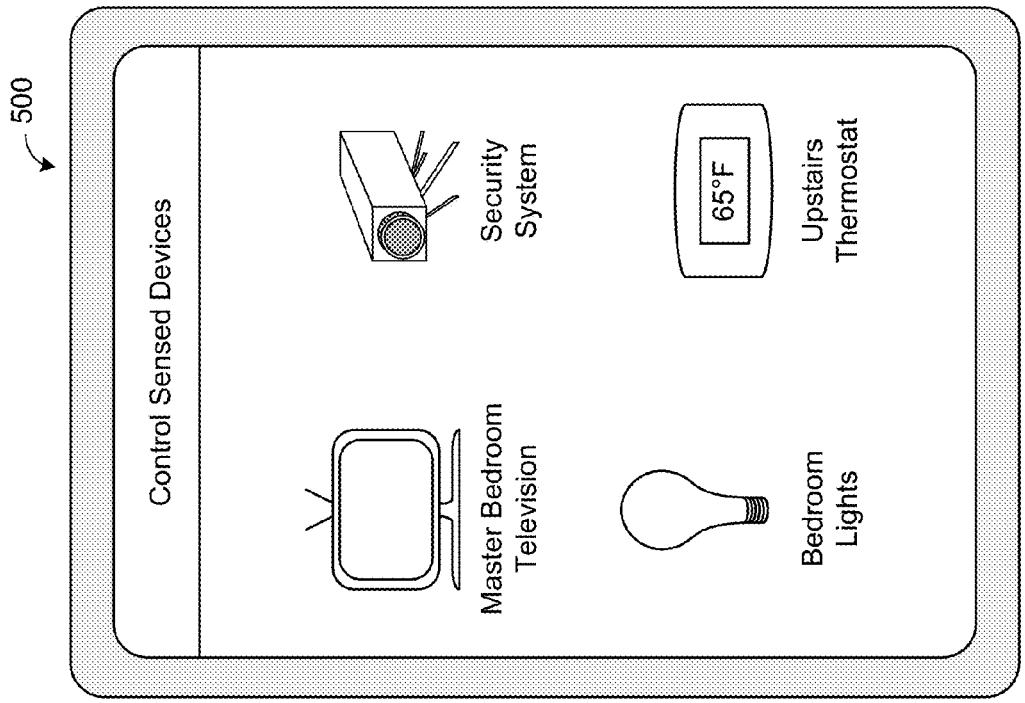
Figure 5C:
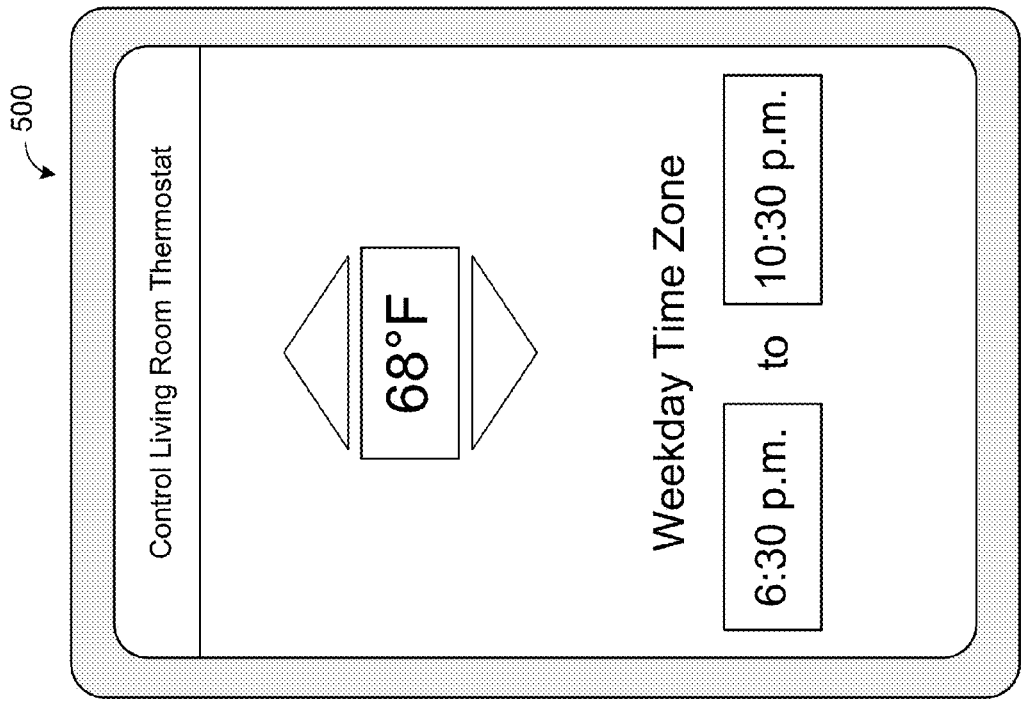

When smartphone 120 comes within a threshold proximity of various devices in device cloud 100, an icon for each device may appear on the screen of smartphone 120. For example, in FIG. 5A, when user 101 carries smartphone 120 into the living room, UI 500 displays icons for four devices within threshold proximity: "Main Television" (the TV in the living room), "Curtains," "Living Room Lights," and "Downstairs Thermostat." The standard for being within threshold proximity may differ from one PND-paired device to another, based on factors such as: the range of radio(s) used to establish a connection with the PND-paired device (e.g., a big-screen TV with a Wi-Fi receiver may have a larger range than a watch with a Bluetooth receiver), the usage profile of the PND-paired device (e.g., the normal distance for usage and operation of a big-screen TV—viewing distance—may be farther than the normal distance for usage and operation of a touchscreen tablet—a comfortable arm's-length distance), etc. If user 101 selects the icon for a particular device, an interface may be displayed that enables smartphone 120 to act as a remote control for the selected device. As shown in FIG. 5B, when user 101 selects the "Living Room Lights" icon, an interface is displayed to enable user 101 to control two arrays of dimmer-controlled overhead recessed lighting in the living room while watching television. As shown in FIG. 5C, when user 101 selects the "Downstairs Thermostat" icon, user 101 can also control the air conditioning and subfloor heating in the living room.

In another example scenario, when the user is watching a movie on the TV, (1) an interface may be provided on the smartphone through which the user can control a remote-control car, and (2) a picture-in-picture (PiP) display may appear on the TV where the user can monitor a video camera mounted on the remote-control car to follow the user's toddler or puppy around and monitor what they are doing in another room.

In another example scenario, if a user is working in their home office upstairs with the door closed, the user's laptop may display a first notification when the front door is being opened by someone with a key (at which point a control interface may appear on the screen of the laptop to display an image of the user's child captured by a security camera mounted at the front door), and then the user's laptop may display a second notification when the TV downstairs has just been turned on and the channel changed to view cartoons (at which point, the control interface may provide a feature to take over control of the TV and either turn it off, change the channel to an educational channel, or transmit audio through the TV's speakers so that the user can tell their child to go do their homework).

In another example scenario, as the user walks through the house before going to bed, different interfaces may pop up on the screen of the smartphone as the user walks down a hallway and passes different rooms, where each interface displays a UI to control aspects of the associated room (e.g., to turn off lights, lock doors, turn off TVs, silence phone ringers, draw curtains, etc.). As shown in FIG. 5D, after user 101 is done watching television and goes upstairs to go to bed, smartphone 120 senses devices in the master bedroom and displays icons to control those devices: "Master Bedroom Television," "Security System," "Bedroom Lights," "Upstairs Thermostat."

In some embodiments, instead of having a single designated control device that is physically carried with the user, PND 110 may transfer the designation from device to device within the device cloud, based on which device (that is able to provide an adequate control interface) is in closest proximity to PND 110 (and, presumably, the user). Different types of control interfaces (e.g., display screen, embedded microphone to detect spoken commands, embedded 3D motion sensor to detect gesture commands, etc.) may be integrated into different types of devices. For example, when the user is in their car (with embedded microphones and a touch screen in the dashboard), the user may command the garage door to open and the oven to begin pre-heating as the car turns onto their street (and PND 110 comes within Wi-Fi range of the user's house). After the user parks their car in the garage, PND 110 detects that the user has walked away from the car and into the kitchen, and transfers the control device designation from the car to a refrigerator with an interactive screen, embedded microphones, and embedded 3D motion sensors in the door. Now that the refrigerator is the designated control device while the user is cooking in the kitchen, the user can monitor a videocamera trained on a baby sleeping upstairs, and, while hands are messy, give spoken commands and/or motion gesture commands to the refrigerator to reply to a text message sent to smartphone 120.

In particular embodiments, automatic and active controls may be triggered simultaneously—for example, if there is one person in a large home with many rooms, as the person walks through different rooms in the house to cook dinner, watch TV, use the restroom, and go to sleep, each room may automatically adjust the temperature and lighting as the user enters and leaves the room, and an interface to may briefly pop up on the user's smartphone for the first 20 seconds after the user enters a new room to allow the user to actively control the temperature and lighting as well.

In a group situation, such as where each member of a household has their own individual PND that is carried on their person, each PND may be configured for individual authentication and authorization. In this manner, different permissions may be granted to each PND (e.g., the parents may have administrative-level controls over all devices, whereas teenagers may have restricted controls, and toddlers/ pets may have no controls). In this scenario, when each PND is paired with one or more devices in the house, automatic controls may be implemented to control a particular device based on the particular PND that is detected in proximity to the device.

For example, a toddler's or puppy's PND may be configured so that the PND acts as a tracking device that notifies devices in the home as the PND approaches. If the PND and/or a PND-paired device detects that the toddler/puppy is approaching, the PND may send a signal to the PND-paired device to take certain actions that would not be triggered by a PND configured for an adult or older child (e.g., a mechanized baby gate automatically closes off access to a stairwell). In another example, if a toddler wakes up and approaches the living room where adults are watching a horror movie, the TV may automatically pause the movie and display a screensaver or a channel appropriate for children. In another example, if a secure cabinet containing medicines/liquor/cleaning supplies detects that a child is approaching the cabinet without any adults in proximity, the secure cabinet may lock its door(s).

In a situation involving one or more roaming users (each carrying a PND on their person) who are not members of the household, varying levels of control may be granted to the roaming users based on social-networking information or other information. For example, differing access permissions may be granted to different service providers depending on their different roles (e.g., gardeners may need access to a side gate to the backyard, but not access into the house; a nanny may need access to the house, but not to the parents' bedroom or the home office; a housecleaner may need access to almost all areas of the house; houseguests staying at the house while the owner is away may obtain access to everything except particular closets and the liquor cabinet, and may not be granted access to purchase on-demand movies).

Other roaming users to whom members of the household may be connected by way of a social graph may be granted permissions in accordance with social graph information and other social-networking information (e.g., first-degree friends may automatically be granted access to the home Wi-Fi network). Such permissions may be granted/restricted by, as examples without limitation: (1) restricting access to other social-network users (e.g., by confirming that they have a valid user identifier), (2) restricting access to other social-network users within their social graph, (3) restricting access to other social-network users within a threshold degree of separation, or (4) restricting access according to any other property or attribute associated with an element of the user's social graph (e.g., only allowing access to other social-network users in a designated group).

Figure 6:
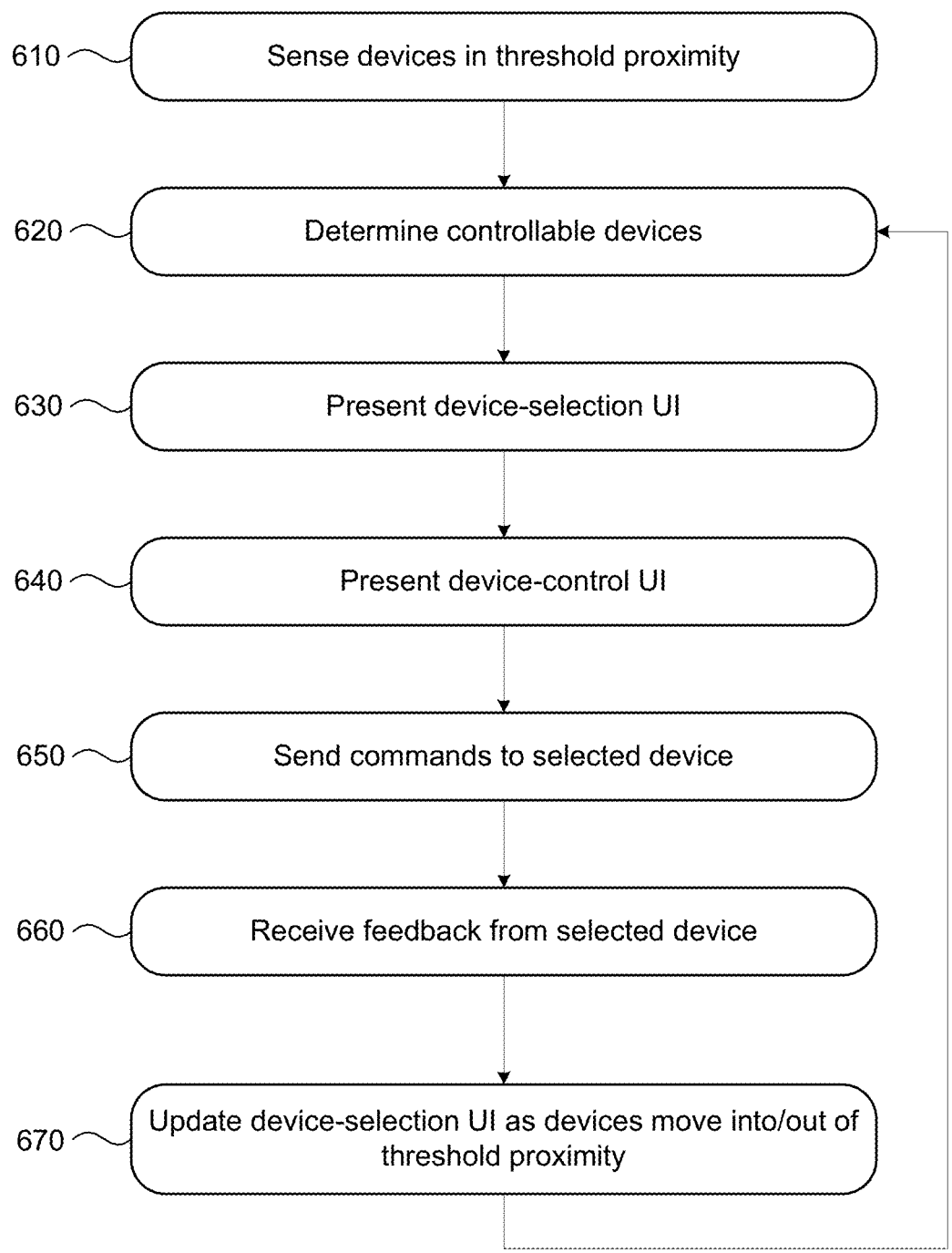
FIG. 6 illustrates an example method 600 for presenting a user interface to control devices in a device cloud.

FIG. 6 illustrates an example method 600 for providing seamless and portable network connectivity for a user's devices. The method may begin at step 610, where a particular device in device cloud 100 designated as a control device (e.g., smartphone 120) senses one or more other devices in device cloud 100 within a threshold proximity. The threshold proximity may be assessed with respect to the location of the control device, or with respect to the location of the PND. In particular embodiments, only a device associated with a specific user may be used as a control device. In step 620, the control device determines which of the devices within a threshold proximity are controllable. This determination may be made by retrieving such information from the PND, or by the control device itself. In step 630, the control device presents a UI that enables a user to view and select each device— in some embodiments, only those devices within a threshold proximity for which the user has authorization to access and/ or control the device. In step 640, upon receiving user input selecting a particular device presented in the UI that the user wishes to access or control, the control device presents a UI to control the selected device. In step 650, the control device sends commands to access or control the selected device, based on user input received by way of the UI. In particular embodiments, the user input may indicate that the user wishes to monitor progress of the selected device with respect to a particular operation (e.g., turn on the oven light and watch the progress of a chocolate soufflé), or receive a notification when a particular event occurs (e.g., temperature of the oven reaches 425° Fahrenheit). The commands may be sent directly from the control device to the selected device, or by way of the PND. In step 660, the control device receives feedback from the selected device (e.g., confirmation that the command was successfully executed, or sensor data indicating a current state of the device. Like the commands, feedback may be sent directly to the control device from the selected device, or by way of the PND. In step 670, the control device may update the UI as the user (and thereby, the control device) moves through physical space, thereby moving towards or away from devices in device cloud 100, and then return to step 620 (in order to determine whether the user has authorization to access and/or control any newly-sensed devices).

In particular embodiments, UI 500 may be displayed in a convenient manner so as not to impair the user experience. For example, if a smartphone and a PND are detected as being within proximity of the TV, the interface to control the TV may be provided in such a way so as not to require the user to unlock their smartphone in order to use the interface (e.g., displaying controls on the locked-screen interface where the user is also prompted to unlock their smartphone). In another example, a notification may be sent to the smartphone that, when clicked on, opens up the device control interface without unlocking the smartphone. In another example, one or more icons to control one or more devices may appear on the locked-screen interface, based on proximity of the smartphone to the one or more devices.

Figure 7:
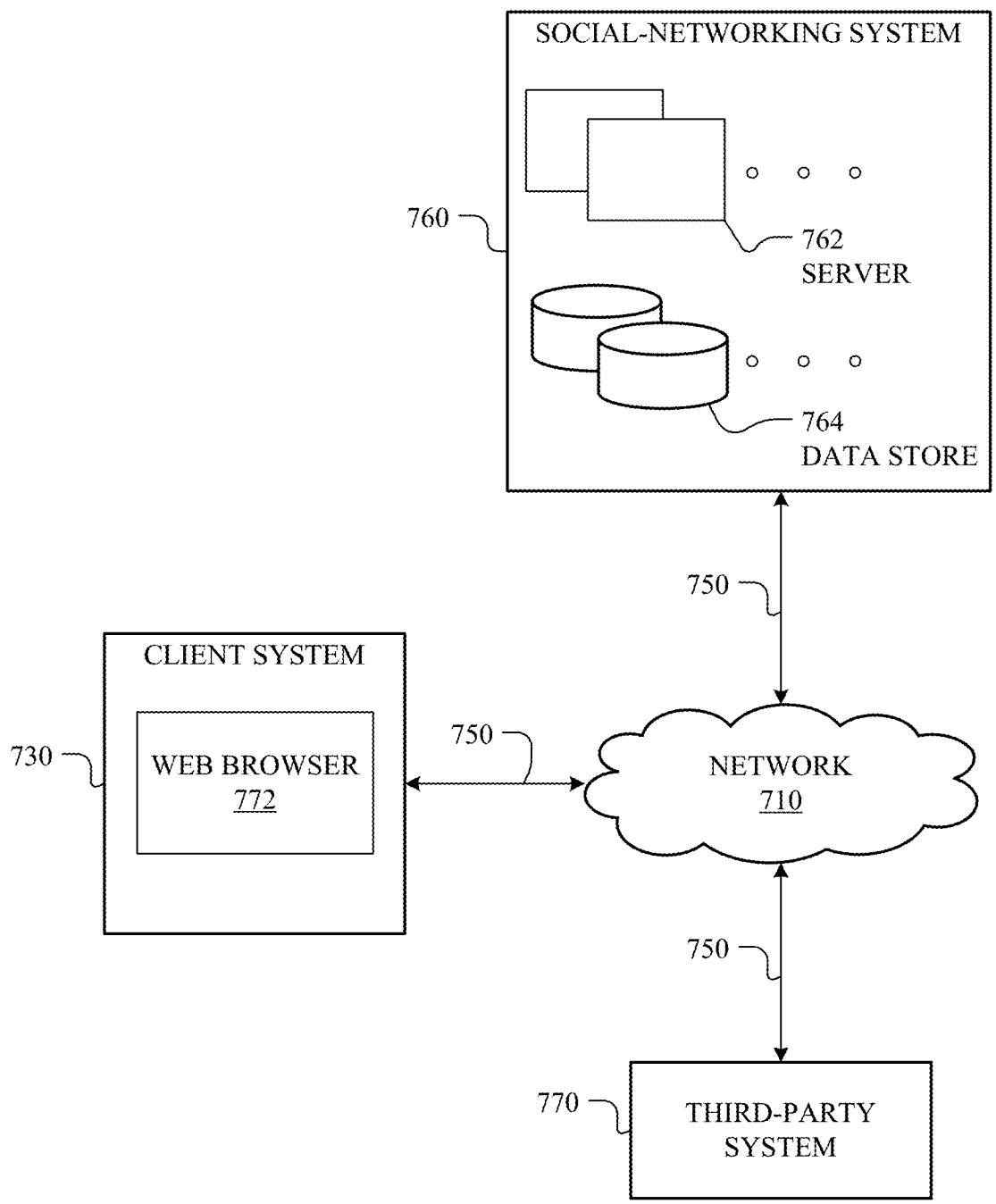
FIG. 7 illustrates an example network environment associated with a social-networking system.

FIG. 7 illustrates an example network environment 700 associated with a social-networking system. Network environment 700 includes a client system 730, a social-networking system 760, and a third-party system 770 connected to each other by a network 710. Although FIG. 7 illustrates a particular arrangement of client system 730, social-networking system 760, third-party system 770, and network 710, this disclosure contemplates any suitable arrangement of client system 730, social-networking system 760, third-party system 770, and network 710. As an example and not by way of limitation, two or more of client system 730, social-networking system 760, and third-party system 770 may be connected to each other directly, bypassing network 710. As another example, two or more of client system 730, social-networking system 760, and third-party system 770 may be physically or logically co-located with each other in whole or in part.

Moreover, although FIG. 7 illustrates a particular number of client systems 730, social-networking systems 760, third-party systems 770, and networks 710, this disclosure contemplates any suitable number of client systems 730, social-networking systems 760, third-party systems 770, and networks 710. As an example and not by way of limitation, network environment 700 may include multiple client system 730, social-networking systems 760, third-party systems 770, and networks 710.

This disclosure contemplates any suitable network 710. As an example and not by way of limitation, one or more portions of network 710 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 710 may include one or more networks 710.

Links 750 may connect client system 730, social-networking system 760, and third-party system 770 to communication network 710 or to each other. This disclosure contemplates any suitable links 750. In particular embodiments, one or more links 750 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 750 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 750, or a combination of two or more such links 750. Links 750 need not necessarily be the same throughout network environment 700. One or more first links 750 may differ in one or more respects from one or more second links 750.

In particular embodiments, client system 730 may be an electronic device including hardware, software, or embedded logic components or a combination of two or more such components and capable of carrying out the appropriate functionalities implemented or supported by client system 730. As an example and not by way of limitation, a client system 730 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 730. A client system 730 may enable a network user at client system 730 to access network 710. A client system 730 may enable its user to communicate with other users at other client systems 730.

In particular embodiments, client system 730 may include a web browser 732, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 730 may enter a Uniform Resource Locator (URL) or other address directing the web browser 732 to a particular server (such as server 762, or a server associated with a third-party system 770), and the web browser 732 may generate a Hyper Text Transfer Protocol (HTTP) request and communicate the HTTP request to server. The server may accept the HTTP request and communicate to client system 730 one or more Hyper Text Markup Language (HTML) files responsive to the HTTP request. Client system 730 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 760 may be a network-addressable computing system that can host an online social network. Social-networking system 760 may generate, store, receive, and send social-networking data, such as, for example, user-profile data, concept-profile data, social-graph information, or other suitable data related to the online social network. Social-networking system 760 may be accessed by the other components of network environment 700 either directly or via network 710. In particular embodiments, social-networking system 760 may include one or more servers 762. Each server 762 may be a unitary server or a distributed server spanning multiple computers or multiple datacenters. Servers 762 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 762 may include hardware, software, or embedded logic components or a combination of two or more such components for carrying out the appropriate functionalities implemented or supported by server 762. In particular embodiments, social-networking system 764 may include one or more data stores 764. Data stores 764 may be used to store various types of information. In particular embodiments, the information stored in data stores 764 may be organized according to specific data structures. In particular embodiments, each data store 764 may be a relational, columnar, correlation, or other suitable database. Although this disclosure describes or illustrates particular types of databases, this disclosure contemplates any suitable types of databases. Particular embodiments may provide interfaces that enable a client system 730, a social-networking system 760, or a third-party system 770 to manage, retrieve, modify, add, or delete, the information stored in data store 764.

In particular embodiments, social-networking system 760 may store one or more social graphs in one or more data stores 764. In particular embodiments, a social graph may include multiple nodes—which may include multiple user nodes (each corresponding to a particular user) or multiple concept nodes (each corresponding to a particular concept)—and multiple edges connecting the nodes. Social-networking system 760 may provide users of the online social network the ability to communicate and interact with other users. In particular embodiments, users may join the online social network via social-networking system 760 and then add connections (e.g., relationships) to a number of other users of social-networking system 760 whom they want to be connected to.

Herein, the term "friend" may refer to any other user of social-networking system 760 with whom a user has formed a connection, association, or relationship via social-networking system 760.

In particular embodiments, social-networking system 760 may provide users with the ability to take actions on various types of items or objects, supported by social-networking system 760. As an example and not by way of limitation, the items and objects may include groups or social networks to which users of social-networking system 760 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 760 or by an external system of third-party system 770, which is separate from social-networking system 760 and coupled to social-networking system 760 via a network 710.

In particular embodiments, social-networking system 760 may be capable of linking a variety of entities. As an example and not by way of limitation, social-networking system 760 may enable users to interact with each other as well as receive content from third-party systems 770 or other entities, or to allow users to interact with these entities through an application programming interfaces (API) or other communication channels.

In particular embodiments, a third-party system 770 may include one or more types of servers, one or more data stores, one or more interfaces, including but not limited to APIs, one or more web services, one or more content sources, one or more networks, or any other suitable components, e.g., that servers may communicate with. A third-party system 770 may be operated by a different entity from an entity operating social-networking system 760. In particular embodiments, however, social-networking system 760 and third-party systems 770 may operate in conjunction with each other to provide social-networking services to users of social-networking system 760 or third-party systems 770. In this sense, social-networking system 760 may provide a platform, or backbone, which other systems, such as third-party systems 770, may use to provide social-networking services and functionality to users across the Internet.

In particular embodiments, a third-party system 770 may include a third-party content object provider. A third-party content object provider may include one or more sources of content objects, which may be communicated to a client system 730. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 760 also includes user-generated content objects, which may enhance a user's interactions with social-networking system 760. User-generated content may include anything a user can add, upload, send, or "post" to social-networking system 760. As an example and not by way of limitation, a user communicates posts to social-networking system 760 from a client system 730. Posts may include data such as status updates or other textual data, location information, photos, videos, links, music or other similar data or media. Content may also be added to social-networking system 760 by a third-party through a "communication channel," such as a newsfeed or stream.

In particular embodiments, social-networking system 760 may include a variety of servers, sub-systems, programs, modules, logs, and data stores. In particular embodiments, social-networking system 760 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 760 may also include suitable components such as network interfaces, security mechanisms, load balancers, failover servers, management-and-network-operations consoles, other suitable components, or any suitable combination thereof. In particular embodiments, social-networking system 760 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 760 to one or more client systems 730 or one or more third-party system 770 via network 710. The web server may include a mail server or other messaging functionality for receiving and routing messages between social-networking system 760 and one or more client systems 730. An API-request server may allow a third-party system 770 to access information from social-networking system 760 by calling one or more APIs. An action logger may be used to receive communications from a web server about a user's actions on or off social-networking system 760. In conjunction with the action log, a third-party-content-object log may be maintained of user exposures to third-party-content objects. A notification controller may provide information regarding content objects to a client system 730. Information may be pushed to a client system 730 as notifications, or information may be pulled from client system 730 responsive to a request received from client system 730. Authorization servers may be used to enforce one or more privacy settings of the users of social-networking system 760. A privacy setting of a user determines how particular information associated with a user can be shared. The authorization server may allow users to opt in to or opt out of having their actions logged by social-networking system 760 or shared with other systems (e.g., third-party system 770), such as, for example, by setting appropriate privacy settings. Third-party-content-object stores may be used to store content objects received from third parties, such as a third-party system 770. Location stores may be used for storing location information received from client systems 730 associated with users. Advertisement-pricing modules may combine social information, the current time, location information, or other suitable information to provide relevant advertisements, in the form of notifications, to a user.

Figure 8:
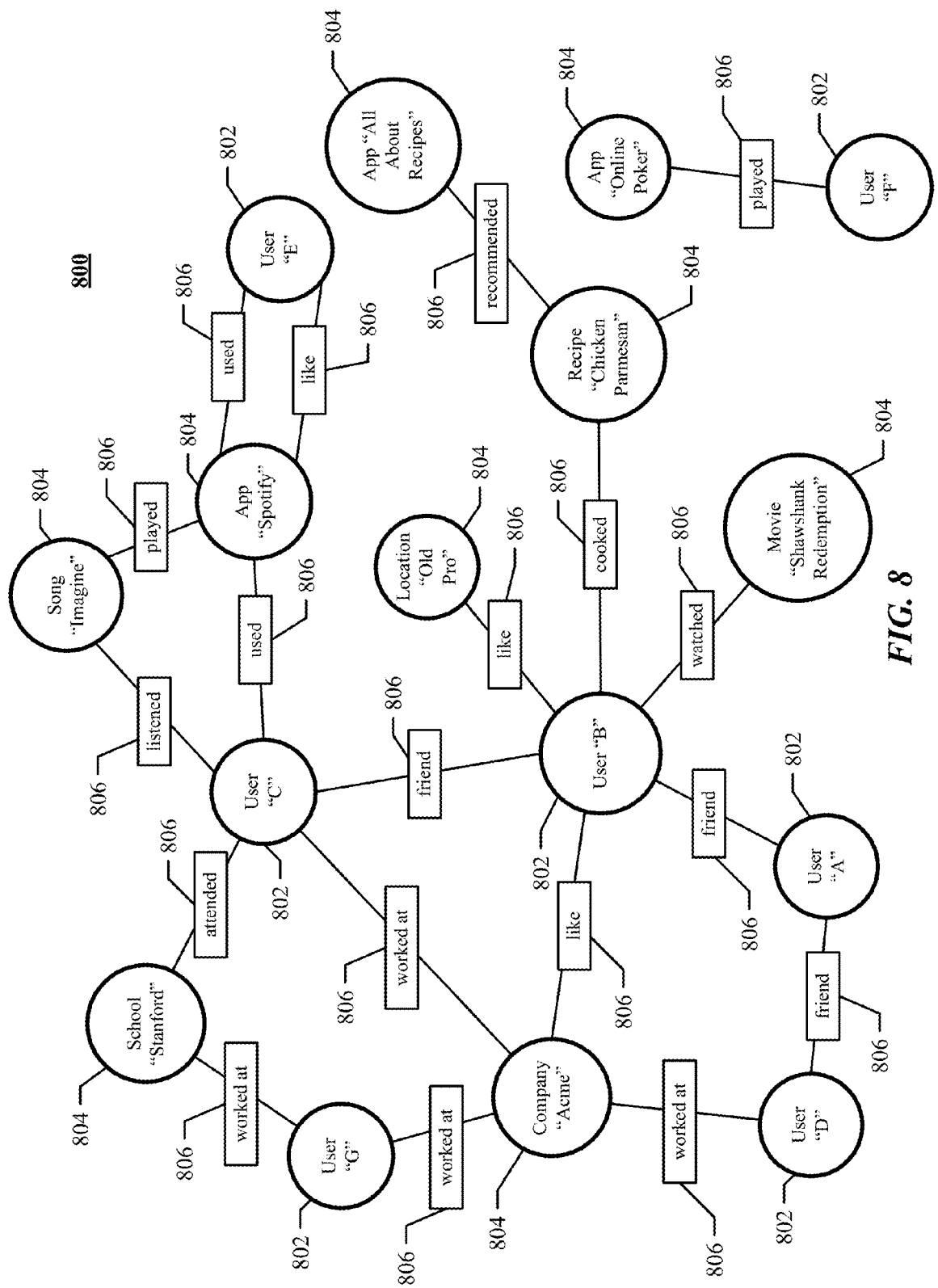
FIG. 8 illustrates an example social graph.

FIG. 8 illustrates example social graph 800. In particular embodiments, social-networking system 760 may store one or more social graphs 800 in one or more data stores. In particular embodiments, social graph 800 may include multiple nodes—which may include multiple user nodes 802 or multiple concept nodes 804—and multiple edges 806 connecting the nodes. Example social graph 800 illustrated in FIG. 8 is shown, for didactic purposes, in a two-dimensional visual map representation. In particular embodiments, a social-networking system 760, client system 730, or third-party system 770 may access social graph 800 and related social-graph information for suitable applications. The nodes and edges of social graph 800 may be stored as data objects, for example, in a data store (such as a social-graph database). Such a data store may include one or more searchable or queryable indexes of nodes or edges of social graph 800.

In particular embodiments, a user node 802 may correspond to a user of social-networking system 760. As an example and not by way of limitation, a user may be an individual (human user), an entity (e.g., an enterprise, business, or third-party application), or a group (e.g., of individuals or entities) that interacts or communicates with or over social-networking system 760. In particular embodiments, when a user registers for an account with social-networking system 760, social-networking system 760 may create a user node 802 corresponding to the user, and store the user node 802 in one or more data stores. Users and user nodes 802 described herein may, where appropriate, refer to registered users and user nodes 802 associated with registered users. In addition or as an alternative, users and user nodes 802 described herein may, where appropriate, refer to users that have not registered with social-networking system 760. In particular embodiments, a user node 802 may be associated with information provided by a user or information gathered by various systems, including social-networking system 760. As an example and not by way of limitation, a user may provide his or her name, profile picture, contact information, birth date, sex, marital status, family status, employment, education background, preferences, interests, or other demographic information. In particular embodiments, a user node 802 may be associated with one or more data objects corresponding to information associated with a user. In particular embodiments, a user node 802 may correspond to one or more webpages.

In particular embodiments, a concept node 804 may correspond to a concept. As an example and not by way of limitation, a concept may correspond to a place (such as, for example, a movie theater, restaurant, landmark, or city); a website (such as, for example, a website associated with social-network system 760 or a third-party website associated with a web-application server); an entity (such as, for example, a person, business, group, sports team, or celebrity); a resource (such as, for example, an audio file, video file, digital photo, text file, structured document, or application) which may be located within social-networking system 760 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 804 may be associated with information of a concept provided by a user or information gathered by various systems, including social-networking system 760. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 804 may be associated with one or more data objects corresponding to information associated with concept node 804. In particular embodiments, a concept node 804 may correspond to one or more webpages.

In particular embodiments, a node in social graph 800 may represent or be represented by a webpage (which may be referred to as a "profile page"). Profile pages may be hosted by or accessible to social-networking system 760. Profile pages may also be hosted on third-party websites associated with a third-party server 770. As an example and not by way of limitation, a profile page corresponding to a particular external webpage may be the particular external webpage and the profile page may correspond to a particular concept node 804. Profile pages may be viewable by all or a selected subset of other users. As an example and not by way of limitation, a user node 802 may have a corresponding user-profile page in which the corresponding user may add content, make declarations, or otherwise express himself or herself. As another example and not by way of limitation, a concept node 804 may have a corresponding concept-profile page in which one or more users may add content, make declarations, or express themselves, particularly in relation to the concept corresponding to concept node 804.

In particular embodiments, a concept node 804 may represent a third-party webpage or resource hosted by a third-party system 770. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 730 to send to social-networking system 760 a message indicating the user's action. In response to the message, social-networking system 760 may create an edge (e.g., an "eat" edge) between a user node 802 corresponding to the user and a concept node 804 corresponding to the third-party webpage or resource and store edge 806 in one or more data stores.

In particular embodiments, a pair of nodes in social graph 800 may be connected to each other by one or more edges 806. An edge 806 connecting a pair of nodes may represent a relationship between the pair of nodes. In particular embodiments, an edge 806 may include or represent one or more data objects or attributes corresponding to the relationship between a pair of nodes. As an example and not by way of limitation, a first user may indicate that a second user is a "friend" of the first user. In response to this indication, social-networking system 760 may send a "friend request" to the second user. If the second user confirms the "friend request," social-networking system 760 may create an edge 806 connecting the first user's user node 802 to the second user's user node 802 in social graph 800 and store edge 806 as social-graph information in one or more of data stores 764. In the example of FIG. 8, social graph 800 includes an edge 806 indicating a friend relation between user nodes 802 of user "A" and user "B" and an edge indicating a friend relation between user nodes 802 of user "C" and user "B." Although this disclosure describes or illustrates particular edges 806 with particular attributes connecting particular user nodes 802, this disclosure contemplates any suitable edges 806 with any suitable attributes connecting user nodes 802. As an example and not by way of limitation, an edge 806 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 800 by one or more edges 806.

In particular embodiments, an edge 806 between a user node 802 and a concept node 804 may represent a particular action or activity performed by a user associated with user node 802 toward a concept associated with a concept node 804. As an example and not by way of limitation, as illustrated in FIG. 8, a user may "like," "attended," "played," "listened," "cooked," "worked at," or "watched" a concept, each of which may correspond to an edge type or subtype. A concept-profile page corresponding to a concept node 804 may include, for example, a selectable "check in" icon (such as, for example, a clickable "check in" icon) or a selectable "add to favorites" icon. Similarly, after a user clicks these icons, social-networking system 760 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 760 may create a "listened" edge 806 and a "used" edge (as illustrated in FIG. 8) between user nodes 802 corresponding to the user and concept nodes 804 corresponding to the song and application to indicate that the user listened to the song and used the application. Moreover, social-networking system 760 may create a "played" edge 806 (as illustrated in FIG. 8) between concept nodes 804 corresponding to the song and the application to indicate that the particular song was played by the particular application. In this case, "played" edge 806 corresponds to an action performed by an external application (SPOTIFY) on an external audio file (the song "Imagine"). Although this disclosure describes particular edges 806 with particular attributes connecting user nodes 802 and concept nodes 804, this disclosure contemplates any suitable edges 806 with any suitable attributes connecting user nodes 802 and concept nodes 804. Moreover, although this disclosure describes edges between a user node 802 and a concept node 804 representing a single relationship, this disclosure contemplates edges between a user node 802 and a concept node 804 representing one or more relationships. As an example and not by way of limitation, an edge 806 may represent both that a user likes and has used at a particular concept. Alternatively, another edge 806 may represent each type of relationship (or multiples of a single relationship) between a user node 802 and a concept node 804 (as illustrated in FIG. 8 between user node 802 for user "E" and concept node 804 for "SPOTIFY").

In particular embodiments, social-networking system 760 may create an edge 806 between a user node 802 and a concept node 804 in social graph 800. As an example and not by way of limitation, a user viewing a concept-profile page (such as, for example, by using a web browser or a special-purpose application hosted by the user's client system 730) may indicate that he or she likes the concept represented by the concept node 804 by clicking or selecting a "Like" icon, which may cause the user's client system 730 to send to social-networking system 760 a message indicating the user's liking of the concept associated with the concept-profile page. In response to the message, social-networking system 760 may create an edge 806 between user node 802 associated with the user and concept node 804, as illustrated by "like" edge 806 between the user and concept node 804. In particular embodiments, social-networking system 760 may store an edge 806 in one or more data stores. In particular embodiments, an edge 806 may be automatically formed by social-networking system 760 in response to a particular user action. As an example and not by way of limitation, if a first user uploads a picture, watches a movie, or listens to a song, an edge 806 may be formed between user node 802 corresponding to the first user and concept nodes 804 corresponding to those concepts. Although this disclosure describes forming particular edges 806 in particular manners, this disclosure contemplates forming any suitable edges 806 in any suitable manner.

Figure 9:
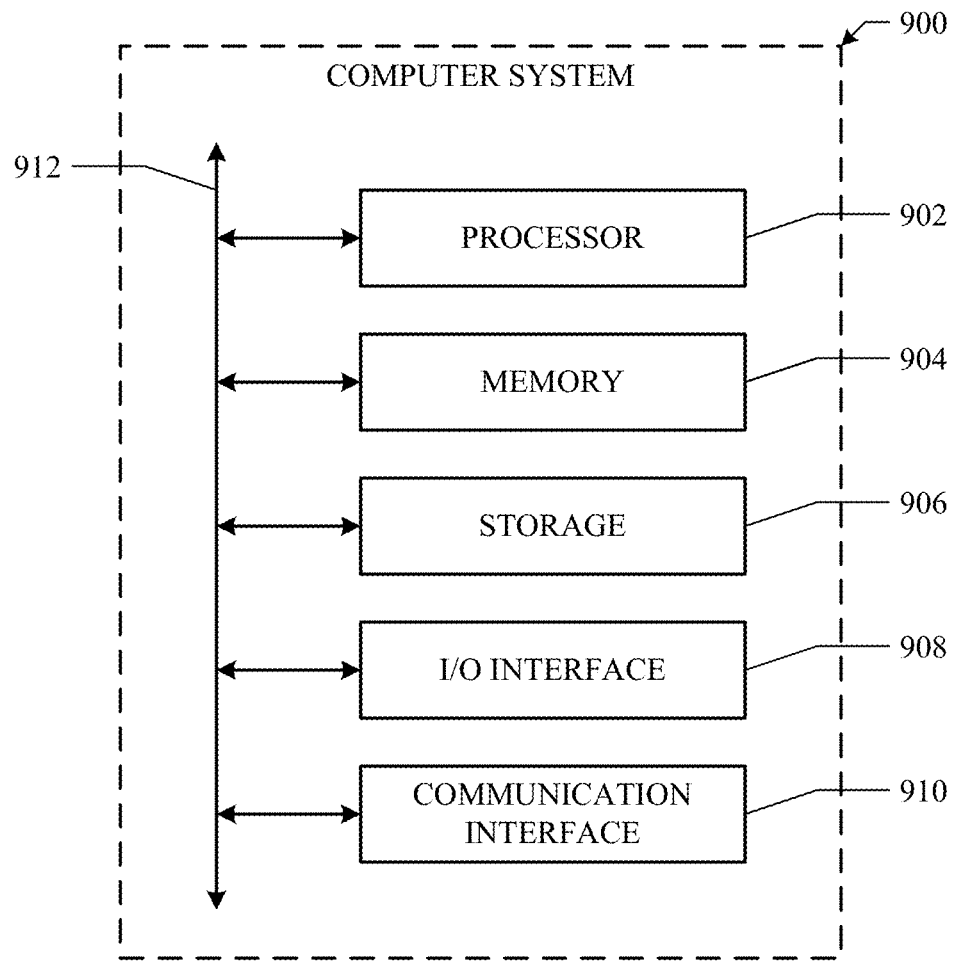
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate, such as dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A first computing device, the computing device comprising:
    a processor;
    one or more radios; and
    a memory coupled to the processor comprising instructions executable by the processor, the processor being operable when executing the instructions to:
        sense, by at least one of the radios, a second portable, networked, computing device within a threshold proximity, wherein the second computing device comprises a processor, one or more radios, and a memory coupled to the processor;
        establish a direct connection with the second device;
        retrieve initial information from the second computing device, the initial information comprising a social-networking system user identifier;
        after authenticating the second computing device based on the initial information, grant credentials to the second computing device, wherein the credentials granted by the first computing device allow the second computing device to communicate with one or more third computing devices, and wherein one or more of the third computing devices comprise a processor, one or more radios, and a memory coupled to the processor.

2. The first computing device of claim 1, wherein the instructions to grant the credentials to the second computing device comprise instructions to:
    determine that a first user node is connected in a social graph to a second user node, wherein the first user node represents a first user associated with the first computing device, wherein the second user node is identified by the social-networking system user identifier, and wherein granting the credentials to the second computing device is based on the determination that the first user node is connected in the social graph to the second user node.

3. The first computing device of claim 2, wherein the instructions to grant the credentials to the second computing device comprise instructions to:
    determine that the first user node is connected to the second user node within a threshold degree of separation.

4. The first computing device of claim 1, wherein the instructions to grant the credentials to the second device comprise instructions to:
    determine that a user identified by the social-networking system user identifier belongs to a user-designated group of trusted friends.

5. The first computing device of claim 1, wherein the instructions to grant the credentials to the second computing device comprise instructions to:
    determine that a user identified by the social-networking system user identifier does not appear on a user-designated black list.

6. The first computing device of claim 1, wherein the instructions to grant the credentials to the second computing device comprise instructions to:
confirm detection of a presence of the first computing device;
confirm successful receipt of permission from the first computing device;
confirm successful receipt of authentication credentials; or
confirm that credentials previously granted to the second computing device have not expired or been revoked.

7. The first computing device of claim 1, wherein the granted credentials authorize a peer-to-peer connection between the second computing device and one or more of the third computing devices.

8. The first computing device of claim 7, wherein the granted credentials authorize access based on a user profile associated with the social-networking system user identifier.

9. A method comprising:
sensing, by a first computing device comprising a plurality of radios, a second portable, networked, computing device within a threshold proximity, wherein the second computing device comprises a processor, one or more radios, and a memory coupled to the processor;
establishing, by the first computing device, a direct connection with the second device;
retrieving, by the first computing device, initial information from the second device, the initial information comprising a social-networking system user identifier;
after authenticating the second computing device, by the first computing device, based on the initial information, granting, by the first computing device, credentials to the second computing device, wherein the credentials granted by the first computing device allow the second computing device to communicate with one or more third computing devices, and wherein one or more of the third computing devices comprise a processor, one or more radios, and a memory coupled to the processor.

10. The method of claim 9, wherein granting the credentials to the second computing device comprises:
determining that a first user node is connected in a social graph to a second user node, wherein the first user node represents a first user associated with the first computing device, wherein the second user node is identified by the social-networking system user identifier, and wherein granting the credentials to the second computing device is based on the determination that the first user node is connected in the social graph to the second user node.

11. The method of claim 10, wherein granting the credentials to the second computing device comprises:
determining that the first user node is connected to the second user node within a threshold degree of separation.

12. The method of claim 9, wherein granting the credentials to the second computing device comprises:
determining that a user identified by the social-networking system user identifier belongs to a user-designated group of trusted friends.

13. The method of claim 9, wherein granting the credentials to the second computing device comprises:
determining that a user identified by the social-networking system user identifier does not appear on a user-designated black list.

14. The method of claim 9, wherein granting the credentials to the second computing device comprises:
confirming detection of a presence of the first computing device;
confirming successful receipt of permission from the first computing device;
confirming successful receipt of authentication credentials; or
confirming that credentials previously granted to the second computing device have not expired or been revoked.

15. The method of claim 9, wherein the granted credentials authorize a peer-to-peer connection between the second computing device and one or more of the third computing devices.

16. The method of claim 15, wherein the granted credentials authorize access based on a user profile associated with the social-networking system user identifier.

17. One or more computer-readable non-transitory storage media embodying software that is operable when executed to:
sense, by a plurality of radios, a second portable, networked, computing device within a threshold proximity of a first computing device, wherein the second computing device comprises a processor, one or more radios, and a memory coupled to the processor;
establish a direct connection between the first computing device and the second computing device;
retrieve initial information from the second computing device, the initial information comprising a social-networking system user identifier;
after authenticating the second computing device based on the initial information, grant credentials to the computing second device, wherein the credentials granted by the first computing device allow the second computing device to communicate with one or more third computing devices, and wherein one or more of the third computing devices comprise a processor, one or more radios, and a memory coupled to the processor.

18. The media of claim 17, wherein the software operable when executed to grant the credentials to the second computing device is further operable to:
determine that a first user node is connected in a social graph to a second user node, wherein the first user node represents a first user associated with the first computing device, wherein the second user node is identified by the social-networking system user identifier, and wherein granting the credentials to the second computing device is based on the determination that the first user node is connected in the social graph to the second user node.

19. The media of claim 18, wherein the software operable when executed to grant the credentials to the second computing device is further operable to:
determine that the first user node is connected to the second user node within a threshold degree of separation.

20. The media of claim 17, wherein the software operable when executed to grant the credentials to the second computing device is further operable to:
determine that a user identified by the social-networking system user identifier belongs to a user-designated group of trusted friends.

21. The media of claim 17, wherein the software operable when executed to grant the credentials to the second computing device is further operable to:
determine that a user identified by the social-networking system user identifier does not appear on a user-designated black list.

22. The media of claim 17, wherein the software operable when executed to grant the credentials to the second computing device is further operable to:
confirm detection of a presence of the first computing device;
confirm successful receipt of permission from the first computing device;

confirm successful receipt of authentication credentials; or
confirm that credentials previously granted to the second computing device have not expired or been revoked.

23. The media of claim 17, wherein the granted credentials authorize a peer-to-peer connection between the second computing device and one or more of the third computing devices.

24. The media of claim 23, wherein the granted credentials authorize access based on a user profile associated with the social-networking system user identifier.

* * * * *